(12) United States Patent
Hoshuyama et al.

(10) Patent No.: US 7,635,513 B1
(45) Date of Patent: Dec. 22, 2009

(54) HEAT RESISTANT MICROPOROUS FILM

(75) Inventors: Izumi Hoshuyama, Yokohama (JP);
Fujiharu Nagoya, Yokohama (JP);
Ichiro Koguma, Yokohama (JP)

(73) Assignee: Asahi Kasei Medical Co., Ltd. (JP)

( * ) Notice: Subject to any disclaimer, the term of this patent is extended or adjusted under 35 U.S.C. 154(b) by 206 days.

(21) Appl. No.: 10/110,186

(22) PCT Filed: Oct. 20, 2000

(86) PCT No.: PCT/JP00/07313

§ 371 (c)(1),
(2), (4) Date: Apr. 8, 2002

(87) PCT Pub. No.: WO01/28667

PCT Pub. Date: Apr. 26, 2001

(30) Foreign Application Priority Data

Oct. 22, 1999 (JP) ................................. 11-301310
Oct. 22, 1999 (JP) ................................. 11-301330

(51) Int. Cl.
*B32B 3/26* (2006.01)
*B05B 3/00* (2006.01)
(52) U.S. Cl. .............. 428/304.4; 428/315.5; 428/316.6; 264/28; 264/41; 264/49
(58) Field of Classification Search ............. 428/304.4, 428/315.5, 316.6; 264/41, 28, 49
See application file for complete search history.

(56) References Cited

U.S. PATENT DOCUMENTS

| | | | |
|---|---|---|---|
| 4,247,498 A * | 1/1981 | Castro ........................ 264/41 |
| 4,399,035 A | 8/1983 | Nohmi et al. |
| 4,539,256 A * | 9/1985 | Shipman .................. 428/315.5 |
| 4,618,533 A | 10/1986 | Steuck |
| 4,808,315 A | 2/1989 | Manabe et al. |
| 4,845,132 A | 7/1989 | Masuoka et al. |
| 4,937,115 A * | 6/1990 | Leatherman ............... 428/36.4 |
| 4,944,879 A | 7/1990 | Steuck |
| 5,017,292 A | 5/1991 | DiLeo et al. |
| 5,514,461 A | 5/1996 | Meguro et al. |
| 5,788,862 A | 8/1998 | Degen et al. |
| 6,019,925 A | 2/2000 | Diamantoglou et al. |

(Continued)

FOREIGN PATENT DOCUMENTS

EP 0 297 744 A2 1/1989

(Continued)

OTHER PUBLICATIONS

European Search Report dated Mar. 31, 2004.

(Continued)

*Primary Examiner*—Victor S Chang
(74) *Attorney, Agent, or Firm*—Dickstein, Shapiro, LLP.

(57) ABSTRACT

A heat resistant microporous membrane containing a thermoplastic resin having a crystalline melting point of 140-300° C. and having a layer structure formed in the direction of membrane thickness, said layer structure containing 5-100% of a layer defined by the following (A) and 95-0% of a layer defined by the following (B):

(A) a layer in which the micropores are intra-spherulitic voids, and (B) a layer in which the micropores are intra-spherulitic voids and inter-spherulitic voids.

15 Claims, 12 Drawing Sheets

U.S. PATENT DOCUMENTS

| | | | |
|---|---|---|---|
| 6,096,213 | A | 8/2000 | Radovanovic et al. |
| 6,096,313 | A | 8/2000 | Jager et al. |
| 6,299,773 | B1 * | 10/2001 | Takamura et al. ...... 210/500.23 |
| 6,368,587 | B1 | 4/2002 | Anders et al. |
| 7,073,671 | B2 | 7/2006 | Charkoudian |
| 7,108,791 | B2 | 9/2006 | Tkacik et al. |
| 7,140,496 | B2 | 11/2006 | Nagoya et al. |
| 7,208,200 | B2 | 4/2007 | Kools |
| 7,284,668 | B2 | 10/2007 | Charkoudian |
| 2003/0209485 | A1 | 11/2003 | Kools |
| 2004/0023017 | A1 | 2/2004 | Nagoya et al. |

FOREIGN PATENT DOCUMENTS

| | | |
|---|---|---|
| EP | 0 302 949 A1 | 2/1989 |
| EP | 0 365 112 A2 | 4/1990 |
| EP | 1 063 256 A1 | 12/2000 |
| EP | 1 206 961 A1 | 5/2002 |
| EP | 1 230 970 A1 | 8/2002 |
| JP | 58-91732 A | 5/1983 |
| JP | 59-16503 A | 1/1984 |
| JP | 59-64640 A | 4/1984 |
| JP | 60-97001 A | 5/1985 |
| JP | 62-179540 | 8/1987 |
| JP | 3-502180 A | 5/1991 |
| JP | 3-228671 | 10/1991 |
| JP | 5-506883 A | 10/1993 |
| JP | 7173323 | 7/1995 |
| JP | 7-265674 A | 10/1995 |
| JP | A-8-168658 | 4/1998 |
| JP | 2000-15066 A | 1/2000 |
| JP | 2001 157827 | 6/2001 |
| JP | 2001 190940 | 7/2001 |
| WO | WO 91/16968 | 11/1991 |
| WO | WO-93/04223 A1 | 3/1993 |
| WO | WO 93/22039 | 11/1993 |
| WO | WO 95/23640 A1 | 9/1995 |
| WO | WO-98/39379 A1 | 9/1998 |
| WO | WO 99/47593 | 9/1999 |
| WO | WO 01/05492 A1 | 1/2001 |
| WO | WO 01/14047 A1 | 3/2001 |
| WO | WO 01/28667 A1 | 4/2001 |
| WO | WO 02/102500 | 12/2002 |

OTHER PUBLICATIONS

Supplementary European Search Report dated Aug. 30, 2004.
Translation of the International Search Report compiled for the parent PCT application PCT/JP2003/13329.

* cited by examiner f

HEAT RESISTANT MICROPOROUS FILM

TECHNICAL FIELD

The present invention relates to a microporous membrane containing a thermoplastic resin having a crystalline melting point of 140-300° C. and a method for producing the same.

CROSS-REFERENCE TO RELATED APPLICATION

This is the national stage of PCT/JP00/07313.

BACKGROUND ART

Recently, when preparations such as plasma fraction preparations and bio-medicines are administered to human bodies, there is a sense of growing crisis regarding pathogens such as bacteria, viruses and pathogenic proteins which might be contained in the preparations, and a membrane filtration method using separating membranes is increasingly noticed as a useful means for physical removal of these pathogens. Microporous membranes used for these purposes are generally called medical separating membranes.

Viruses include microviruses such as parvoviruses of 18-24 nm in diameter, polioviruses of 25-30 nm in diameter, EMC viruses of 28-30 nm in diameter, and type A hepatitis viruses of 28-30 nm in diameter. Microporous membranes of about 50 nm in pore diameter can be utilized as pre-filters for this microvirus group.

Viruses having medium sizes include type B hepatitis viruses of 40-45 nm in diameter, SV40 viruses of 45-55 nm in diameter, BVD viruses of 40-60 nm in diameter, sindbis viruses of 60-70 nm in diameter, etc., and viruses having larger sizes include HIV viruses of 80-100 nm in diameter and further larger viruses of 300 nm in diameter. For physical removal of these virus groups by the membrane filtration method, microporous membranes of at most 100 nm in maximum pore diameter are necessary, and recently the need for removal of smaller viruses such as parvoviruses has increased.

On the other hand, virus removing membranes used for purification of plasma fraction preparations and bio-medicines are required to have not only the virus removing performance, but also a high permeability to physiological active substances such as albumin and globulin. Therefore, ultrafiltration membranes having a pore diameter of about several nm or reverse osmosis membranes having even smaller pore diameters are not suitable as virus removing membranes.

Furthermore, even if microporous membranes have pore diameters suitable for removal of viruses, those which have large voids inside the membranes and bear their filtration characteristics by the surface skin layer are low in certainty for removal of viruses. This is because there are always present significant defects such as pin holes and cracks in the skin layer, and the inside of the membrane hardly contributes to removal of viruses owing to the large voids present therein. Therefore, in order to surely remove viruses, microporous membranes having uniform structure containing substantially no large voids inside the membranes are desired. The skin layer here means a very thin layer which is present on one or both sides of the membrane and has a denser structure as compared with the other inner portions of the membrane.

Furthermore, since preparations such as plasma fraction preparations and bio-medicines are generally highly viscous liquids, application of high filtration pressure in filtration to increase filtration rate is preferred in terms of high industrial productivity. Therefore, high-strength microporous membranes are necessary which do not undergo breakage, rupture, damaging, and dimensional distortion under high filtration pressure. Especially, filtration pressure applied to microporous membranes tends to increase with decrease of the pore diameter, and very high strength is required for withstanding the high filtration pressure.

Moreover, medical separating membranes are subjected to some sterilization treatment at the final step for assuring safety as products. The sterilization treatment includes a method of using medicines, a method of irradiation with ultraviolet rays or γ rays, a method of heating with steam, and others. If medicines are used, there is some concern about the slight amount of residual medicines in the separating membranes which may adversely affect human bodies. Use of ultraviolet rays is not suitable for sterilization of opaque materials because of low transmission of ultraviolet rays. Use of γ rays may inflict irradiation damage on the separating membranes and is, hence, doubtful in reliability. The method of using steam is the safest and surest method and is suitable. Therefore, materials of microporous membranes used for medical separating membranes are required to have heat resistance since the membranes must be subjected to steam sterilization at high temperatures.

Furthermore, in many cases, protein which is a component of preparations adsorbs to the separating membranes to cause clogging of micropores of the separating membranes, resulting in troubles such as reduction of permeation amount or deterioration of the components of the preparations. Accordingly, the medical separating membranes are sometimes required to have hydrophilic properties in order to prevent adsorption of protein. Preferred materials are those to which hydrophilic properties can be imparted, depending on their applications.

Conventional microporous membranes have any of the following defects: (1) they do not have such pore diameter as capable of sufficiently removing small viruses such as parvoviruses; (2) they have large voids and hence have no secure virus removing ability; (3) they have a very dense skin layer on the surface and hence cannot sufficiently permeate effective physiologically active substances such as globulin; (4) they are so low in strength that they cannot stand high filtration pressure and that sufficient filtration rate cannot be obtained; (5) they do not have heat resistance high enough to withstand steam sterilization; and the like.

Moreover, in the applications other than medical separating membranes, high performances are required in distribution of pore diameter, sectional structure of membranes, strength, heat resistance, etc. For example, as filters for industrial processing which remove fine particles, sediments or impurities in purification of chemicals, waste water disposal, or pre-production of pure water, there are generally used filters made of polytetrafluoroethylene resin or metals. What is required for filters for industrial processing is that they have a wide spectrum of pore diameters applicable to fine particles with various sizes, comprise materials having chemical resistance, and withstand the use at high temperatures and have enough strength to withstand high filtration pressures. Moreover, since they are general-purpose filters, they must be low in cost.

However, although filters made of polytetrafluoroethylene resin have excellent heat resistance, the materials are expensive and productivity is low. Although filters made of metals also have excellent heat resistance, they are inferior in ability to remove fine particles because they are composed of mesh woven fabrics or sintered materials. Therefore, techniques that can cover a wide spectrum of pore diameters and can provide inexpensive microporous membranes are earnestly demanded.

In addition, microporous membranes are utilized as membranes for separating oil and water or for separating liquid and gas, separating membranes for purification of tap water and sewage, and separators of lithium ion batteries or supports for solid electrolytes of polymer batteries, and they are required to have high performances as to pore size distribution, sectional structure of membrane, strength and heat resistance.

JP-A-3-502180 and JP-A-5-506883 disclose porous materials made of thermoplastic resins or polyvinylidene fluoride resins and comprising a polymer strand structure formed by thermally-induced liquid-liquid phase separation. According to these patent publications, since liquid-liquid phase separation mechanism is applied, these porous materials consist only of layer (B) as mentioned in claim 1 of the present invention, in which micropores are intra-spherulitic voids and inter-spherulitic voids and only microporous membranes having large pore diameters of submicron order, namely, not less than 0.1 μm, can be obtained and microviruses cannot be removed. Furthermore, strength of microporous membranes tends to be somewhat inferior.

Various technologies using non-solvent induction type phase separation which is the so-called wet method have hitherto been disclosed, for example, in JP-A-58-91732 and JP-A-59-16503. These patent publications disclose that the membranes do not contain microvoids of more than 20 μm.

Furthermore, JP-A-7-265674 discloses a polyvinylidene fluoride membrane usable for removal of viruses from solutions. According to these non-solvent induction type phase separation methods, the spherulites which constitute layer (A) as mentioned in claim 1 of the present invention are not produced, and the resulting microporous membranes have the defect of considerably low strength.

JP-A-59-64640 discloses microporous sheet materials made of thermoplastic resins formed by thermally-induced solid-liquid phase separation. Although this patent publication also discloses technology relating to polyvinylidene fluoride resins, the layer structure of section of the microporous materials is constituted only of the layer (B) where the micropores are intra-spherulitic voids and inter-spherulitic voids as shown in Comparative Example 1 in the present specification, and hence the materials are considerably brittle.

DISCLOSURE OF INVENTION

The object of the present invention is to provide a microporous membrane having heat resistance, having a layer excellent in pore diameter uniformity and having high permeability and, furthermore, a microporous membrane having high strength, and a method for producing the microporous membrane.

As a result of intensive research conducted by the inventors for solving the above problems, it has been found that a microporous membrane excellent in strength and pore diameter uniformity can be obtained when it has a layer (A) in which the micropores are formed of intra-spherulitic voids at a given proportion or higher. Thus, the present invention has been accomplished.

That is, the present invention is as follows.

1. A heat resistant microporous membrane containing a thermoplastic resin having a crystalline melting point of 140-300° C. and having a layer structure formed in the direction of membrane thickness, said layer structure containing 5-100% of a layer defined by the following (A) and 95-0% of a layer defined by the following (B):

(A) a layer in which the micropores are intra-spherulitic voids, and (B) a layer in which the micropores are intra-spherulitic voids and inter-spherulitic voids.

2. A heat resistant microporous membrane according to the above 1, which has a maximum pore diameter of 10-150 nm as determined by a bubble point method and a porosity of 30-90%.

3. A heat resistant microporous membrane according to the above 2, which has a maximum pore diameter of 10-50 nm as determined by a bubble point method.

4. A heat resistant microporous membrane according to the above 1, 2 or 3, wherein the thermoplastic resin is a polyvinylidene fluoride resin.

5. A method for producing a heat resistant microporous membrane which comprises heating a composition containing a thermoplastic resin having a crystalline melting point of 140-300° C. and a plasticizer and having a thermally-induced solid-liquid phase separation point thereby uniformly melting the composition, cooling the melt at a cooling rate of not lower than 50° C./min. to solidify the melt, and then removing the substantial part of said plasticizer, where said composition has a phase separation point depression constant ($\alpha$) of 0-40° C. defined by the following formula (1):

$$\alpha = 100 \times (T_C^0 - T_C) \div (100 - C) \quad (1)$$

(in the above formula, $\alpha$ denotes a phase separation point depression constant (° C.), $T_C^0$ denotes a crystallizing point (° C.) of the thermoplastic resin, $T_C$ denotes a thermally-induced solid-liquid phase separation point (° C.) of said composition, and C denotes a concentration (% by weight) of the thermoplastic resin in the composition).

6. A method for producing a heat resistant microporous membrane according to the above 5, which includes the step of heat treatment.

7. A method for producing a heat resistant microporous membrane according to the above 5 or 6, which includes the step of a hydrophilizing treatment.

8. A method for producing a heat resistant microporous membrane according to the above 5, 6 or 7, wherein the thermoplastic resin is a polyvinylidene fluoride resin.

9. A method for producing a heat resistant microporous membrane according to the above 8, wherein the plasticizer is dicyclohexyl phthalate or diamyl phthalate.

BEST MODE FOR CARRYING OUT THE INVENTION

In the microporous membrane of the present invention, spherulite means a spherical crystal which comprises a thermoplastic resin and grows radially, and diameter of the spherulite is preferably not more than 100 μm, more preferably 0.5-50 μm, and most preferably 1-20 μm.

The sectional shape of the spherulite can be a true circle or ellipse when the resin is crystallized from a melt of less than 10% by weight in resin concentration, but is generally polygonal when the resin is crystallized from a melt of not less than 10% by weight in resin concentration as in the present invention. It is not preferred that the diameter of the spherulite exceeds 100 μm, since the pore structure of the microporous membrane becomes coarse and causes deterioration of uniformity of the pore diameter. On the other hand, although there is no particular problem in that the diameter of the spherulite is very small, for example, less than 0.1 μm, such microporous membrane can hardly be produced since an unrealistically high cooling rate is needed.

Figure 12:
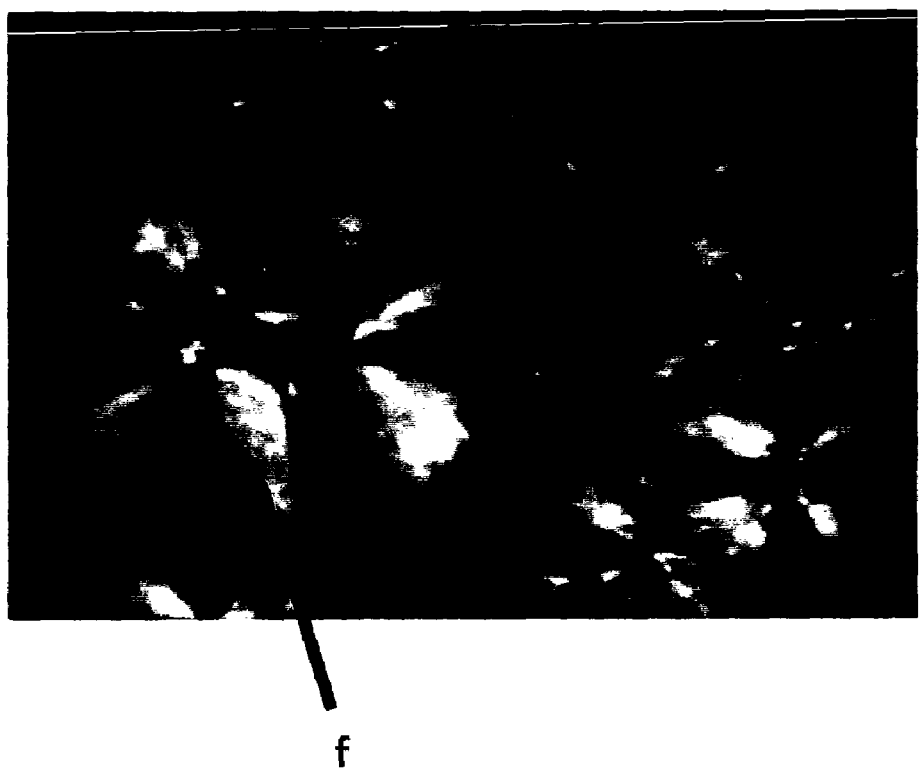
FIG. 12 shows typical patterns of Maltese cross. The symbol f shows Maltese cross images (spherulites).

The first method of observing the spherulites is to observe Maltese crosses using a polarizing microscope. A typical pattern of Maltese cross observed by a polarizing microscope is shown in FIG. 12 explained hereinafter. The second method is to observe using a laser small angle scattering method that the HV scattering image is in the form of cloverleaf.

The intra-spherulitic voids in the microporous membrane of the present invention mean a large number of minute void spaces present inside the spherulites. The intra-spherulitic voids are formed by minute droplets of the plasticizer left within spherulites when the resin undergoes solid-liquid phase separation to produce crystals. In the pore structure of the layer defined by (A) in the microporous membrane of the present invention, the intra-spherulitic voids communicate to each other to form three-dimensional pore paths.

The inter-spherulitic voids in the microporous membrane of the present invention mean coarse void spaces present with forming boundaries among the adjacent spherulites. The inter-spherulitic voids are produced as liquid reservoirs among the adjacent spherulites by exclusion of the plasticizer out of the spherulites as the resin undergoing solid-liquid phase separation to produce crystals. In the pore structure of the layer defined by (B) in the microporous membrane of the present invention, the inter-spherulitic voids communicate to each other to form three-dimensional pore paths. The pore structure formed by the inter-spherulitic voids is inferior in uniformity of pore diameter with increase of pore diameter of micropores as compared with the layer comprising intra-spherulitic voids, and it is difficult to form micropores with maximum pore diameter not more than 150 nm which are excellent in uniformity.

It is essential that the microporous membrane of the present invention contains in the direction of membrane thickness 5-100% of a layer defined by the following (A) and 95-0% of a layer defined by the following (B), and preferably the microporous membrane of the present invention contains 30-100% of the layer defined by the following (A) and 70-0% of the layer defined by the following (B), and most preferably it contains 50-100% of the layer defined by the following (A) and 50-0% of the layer defined by the following (B). The microporous membrane of the present invention may contain other layers as long as the above ranges are satisfied.

If the content of the layer defined by the following (A) is less than 5%, filtration performance of high precision given by a layer excellent in pore uniformity is lost. Moreover, strength of the membrane is deteriorated.

(A) a layer in which the micropores are intra-spherulitic voids.

(B) a layer in which the micropores are intra-spherulitic voids and inter-spherulitic voids.

Figure 11:
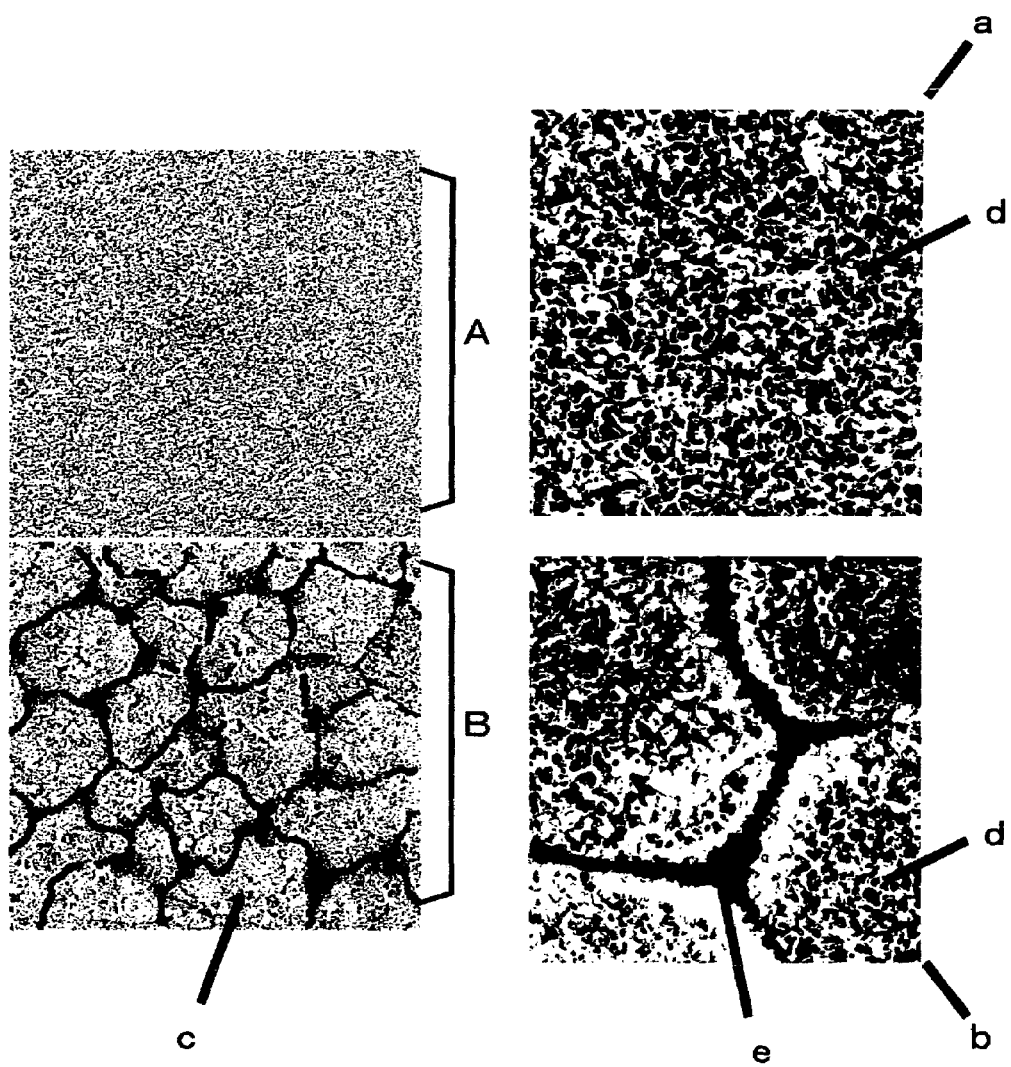
FIG. 11 is a schematic view of the sectional structure of the microporous membrane of the present invention. The symbol A indicates a layer in which the micropores are intra-spherulitic voids, the symbol B indicates a layer in which the micropores are intra-spherulitic voids and inter-spherulitic voids, the symbol a indicates an enlarged view of A, the symbol b indicates an enlarged view of B, the symbol c indicates spherulites, the symbol d indicates intra-spherulitic voids, and the symbol e indicates inter-spherulitic voids.

The features of the porous structure in the microporous membrane of the present invention, namely, spherulites, intra-spherulitic voids, inter-spherulitic voids, and embodiments of the layer in which micropores are intra-spherulitic voids and the layer in which micropores are intra-spherulitic voids and inter-spherulitic voids, are shown in FIG. 11.

The maximum pore diameter of the microporous membrane of the present invention is preferably 10-150 nm, more preferably 10-100 nm, further preferably 10-50 nm. If the maximum pore diameter is less than 10 nm, permeability to physiological active substances such as globulin or filtration rate decreases, and if it exceeds 150 nm, performance for removing of viruses deteriorates. The maximum pore diameter here is a value measured by the bubble point method.

The ratio of the maximum pore diameter and the apparent pore diameter of the microporous membrane of the present invention is preferably 1-15, more preferably 1.2-12, most preferably 1.5-10. The ratio is a value obtained by dividing the maximum pore diameter by the apparent pore diameter measured by the permeation method and indicates uniformity of pore diameter of the microporous membrane. When the ratio is close to 1, this means that the pores theoretically have pore diameter of monodisperse and the pore paths are formed linearly in the direction of membrane thickness. In this case, an ideal permeation amount can be obtained, and hence such microporous membrane is suitable for the uses of screen filtration. On the other hand, when the ratio is close to 15, this means that the pores have some pore diameter distribution or the pore paths are in the form of curved paths, and although the permeation amount is sacrificed, the membrane is superior in performance for removing viruses or fine particles because of the curved paths and is thus suitable for the uses of depth filtration. However, if the ratio exceeds 15, pore diameter uniformity is inferior and this is not preferred.

Porosity of the microporous membrane of the present invention is preferably 30-90%, more preferably 35-85%, and most preferably 35-80%. If the porosity is less than 30%, filtration rate would be insufficient, and if it exceeds 90%, reliability in removal of viruses and the like would lower and simultaneously strength of the microporous membrane would be insufficient.

Thickness of the microporous membrane of the present invention is preferably 1 µm-10 mm, more preferably 5 µm-5 mm, most preferably 10 µm-1 mm. If the thickness is less than 1 µm, reliability in removal of viruses lowers and strength of the microporous membrane tends to become insufficient. If it exceeds 10 mm, the permeation performance tends to become insufficient and this is not preferred.

The water permeation amount of the microporous membrane of the present invention means a performance representing the liquid permeability, and is preferably $10-2\times10^4$, more preferably $20-1\times10^4$, and most preferably $50-5\times10^3$. This water permeation amount is indicated by a numerical value standardized to a membrane thickness of 100 µm, and the unit thereof is L/m$^2$/atm/hour/100 µm. If the water permeation amount is less than 10, the liquid permeation amount will be inferior and the basic performance as separating membranes is damaged, and if it exceeds $2\times10^4$, the strength of the microporous membrane will be damaged and this is not preferred.

Air permeability of the microporous membrane of the present invention means a performance representing the gas permeability, and is preferably $100-1\times10^5$, more preferably $500-5\times10^4$, and most preferably $1\times10^3-5\times10^4$. This air permeability is a numerical value obtained by standardization to a membrane thickness of 100 µm, and the unit thereof is second/in$^2$/cmHg/100 cm$^3$/100 µm. If the air permeability is less than 100, the strength of the microporous membrane is damaged and this is not preferred. If it exceeds $1\times10^5$, the permeation amount of liquid or gas will be inferior and the basic performance as separating membranes is damaged, and this is not preferred.

The tensile break strength of the microporous membrane of the present invention is preferably not less than 10 kgf/cm$^2$, more preferably 15-800 kgf/cm$^2$, and most preferably 20-500 kgf/cm$^2$ in at least uniaxial direction. If the tensile break strength is less than 10 kgf/cm$^2$, troubles such as damages caused by bending, friction and foreign matters or rupture caused by pressure applied at filtration are apt to occur in the microporous membrane. On the other hand, although there is no problem if the tensile break strength is high, for example, if it exceeds 1000 kgf/cm$^2$, such microporous membrane is substantially difficult to produce.

The tensile break elongation of the microporous membrane of the present invention is preferably not less than 10%, more preferably 20-1500%, and most preferably 30-1000% in at least uniaxial direction. If the tensile break elongation is less than 10%, troubles such as damages caused by bending, friction and foreign matters or rupture caused by pressure applied at filtration are apt to occur in the microporous membrane. On the other hand, although there is no problem if the tensile break elongation is as high as, for example, exceeding 2000%, such microporous membrane is substantially difficult to produce.

The thrusting strength of the microporous membrane of the present invention is preferably at least 100 gf/100 µm. The thrusting strength is a value obtained by standardizing the maximum load observed at a breaking point in the thrusting test to a membrane thickness of 100 µm. If the thrusting strength is less than 100 gf/100 µm, troubles such as damages caused by bending, friction and foreign matters or rupture caused by pressure applied at filtration tend to occur in the microporous membrane. On the other hand, although no problems are caused by too high a thrusting strength per se, microporous membranes of, for example, more than 1000 gf/100 µm in the thrusting strength are substantially difficult to produce.

The thrusting depth of the microporous membrane of the present invention is preferably 2-10 mm. If the thrusting depth is less than 2 mm, troubles such as damages caused by bending, friction and foreign matters or rupture caused by pressure applied at filtration tend to occur in the microporous membrane. On the other hand, if the thrusting depth exceeds 10 mm, the microporous membrane tends to be distorted by the pressure applied at filtration and this is not preferred.

The energy in the thrusting test on the microporous membrane of the present invention is preferably at least 2 mJ/100 µm, more preferably 2.5-50 mJ/100 µm, especially preferably 3-30 mJ/100 µm. The energy in the thrusting test is a value standardized to a membrane thickness of 100 µm. If the energy in the thrusting test is less than 2 mJ/100 µm, the membrane tends to become insufficient in strength and has the possibility of not being able to stand a high filtration pressure. On the other hand, although no particular problems are caused by too high an energy in the thrusting test, microporous membranes of, for example, more than 100 mJ/100 µm are substantially difficult to produce.

The burst strength of the microporous membrane of the present invention is preferably 30-500 kgf/cm$^2$, more preferably 35-400 kgf/cm$^2$, and especially preferably 40-300 kgf/cm$^2$. If the burst strength is less than 30 kgf/cm$^2$, the membrane tends to be insufficient in strength and has the possibility of not being able to stand high filtration pressures. On the other hand, although no particular troubles are caused by too high a burst strength, microporous membranes having a burst strength of, for example, more than 500 kgf/cm$^2$ are substantially difficult to produce.

The microporous membrane of the present invention can be produced by heating a composition containing the thermoplastic resin and the plasticizer to uniformly melt it, cooling and solidifying the melt, and then removing the substantial portion of the plasticizer. This production method preferably includes a heat treatment and/or a hydrophilizing treatment. The heat treatment has an effect to further improve the strength and the heat resistance of the microporous membrane, and the hydrophilizing treatment has an effect to inhibit adsorption of physiological active substances such as globulin.

It is essential that the thermoplastic resin used in the present invention has a crystalline melting point of 140-300° C., and the crystalline melting point is preferably 145-250° C., more preferably 150-200° C. If a thermoplastic resin having a crystalline melting point of lower than 140° C. is used, endurance of the microporous membrane against heat in the steam sterilization step indispensable for the use as medical separating membranes or in the high-temperature filtration step which is an important performance requirement in other industrial uses would be lost. On the other hand, if a thermoplastic resin having a crystalline melting point of higher than 300° C. is used, the operation of heating the resin and the plasticizer to uniformly melt them in the production method of the present invention becomes difficult to perform and deterioration of molding processability is caused.

The thermoplastic resins used in the present invention are those which have crystallinity and are used for usual compression molding, extrusion molding, injection molding, inflation molding and blow molding, and include, for example, polyolefin resins such as polypropylene resin, poly-4-methyl-1-pentene resin, etc.; polyester resins such as polyethylene terephthalate resin, polybutylene terephthalate resin, polyethylene naphthalate resin, polybutylene naphthalate resin, polycyclohexylene dimethyleneterephthalate resin, etc.; polyamide resins such as nylon 6, nylon 66, nylon 610, nylon 612, nylon 11, nylon 12, nylon 46, etc.; fluorine-based resins such as polyvinylidene fluoride resin, ethylene/tetrafluoroethylene resin, polychlorotrifluoroethylene resin, etc.; polyphenylene ether resins; polyacetal resins; etc. Polyvinylidene fluoride resins are preferred because they are superior in balance between heat resistance and molding processability.

The polyvinylidene fluoride resins used in the present invention mean fluorine-based polymers having a basic skeleton containing a vinylidene fluoride unit, and are generally called PVDF for short. As the polyvinylidene fluoride resins, there may be used, for example, homopolymers of vinylidene fluoride (VDF) and copolymers of vinylidene fluoride (VDF) with at least one monomer or two selected from the monomer group of hexafluoropropylene (HFP), pentafluoropropylene (PFP), tetrafluoroethylene (TFE), chlorotrifluoroethylene (CTFE) and perfluoromethylvinyl ether (PFMVE). Moreover, the above homopolymers and copolymers can be used in admixture. In the present invention, use of a polyvinylidene fluoride resin containing 30-100% by weight of the homopolymer is preferred because crystallinity of the microporous membrane of the present invention is improved to result in high strength, and use of only the homopolymer is more preferred.

The average molecular weight of the thermoplastic resins used in the present invention is preferably 50,000-5,000,000, more preferably 100,000-2,000,000, and most preferably 150,000-1,000,000. The average molecular weight means a weight average molecular weight measured by GPC (gel permeation chromatography) and the like. In general, for such resins having an average molecular weight exceeding 1,000,000, accurate measurement of the molecular weight by GPC is difficult, and, hence, viscosity average molecular weight measured by viscosity method may be a substitutive method. If the average molecular weight is less than 50,000, the melt tension upon melt molding is lost, causing deterioration in moldability or strength, and this is not preferred. If the average molecular weight exceeds 5,000,000, uniform melt kneading tends to become difficult and it is preferred not to use resins having such average molecular weights.

The plasticizers used in the present invention can be non-volatile solvents capable of forming a uniform solution at temperatures not lower than the crystalline melting point of the resin upon being mixed with the thermoplastic resin. The plasticizers may be in the form of liquid or solid at about room temperature of 20° C. Furthermore, it is necessary to use so-called solid liquid phase separation type plasticizers having a thermally-induced solid-liquid phase separation point when the uniform solution with the thermoplastic resin is cooled.

Moreover, for the plasticizers used in the present invention, it is necessary that the phase separation point depression constant of the composition defined by the following formula (1) is 0-40° C., preferably 1-35° C., more preferably 5-30° C. If the phase separation point depression constant is higher than 40° C., inter-spherulitic voids increase to deteriorate uniformity of pore diameter and strength, and this is not preferred.

$$\alpha = 100 \times (T_C^0 - T_C) \div (100 - C) \tag{1}$$

(in the above formula, $\alpha$ denotes a phase separation point depression constant (° C.), $T_C^0$ denotes a crystallizing point (° C.) of the thermoplastic resin, $T_C$ denotes a thermally-induced solid-liquid phase separation point (° C.) of the composition, and C denotes a concentration (% by weight) of the thermoplastic resin in the composition).

The thermally-induced solid-liquid phase separation point can be obtained by using a previously melt kneaded composition containing the thermoplastic resin and the plasticizer in a given concentration as a sample and by measuring an exothermic peak temperature of the resin by a thermal analysis method (DSC). Furthermore, the crystallizing point of the resin can be obtained by using as a sample the resin previously melt kneaded and similarly by the thermal analysis method.

As the plasticizer, dicyclohexyl phthalate (DCHP) or diamyl phthalate (DAP) is preferred when, for example, a polyvinylidene fluoride resin is selected as the thermoplastic resin. In the case of using two or more plasticizers in admixture, at least one plasticizer selected from the following first group and at least one plasticizer selected from the following second group can be used in admixture. However, when two or more plasticizers are used in admixture, it is also necessary that the phase separation point depression constant of the composition defined by the following formula (1) is 0-40° C.

$$\alpha = 100 \times (T_C^0 - T_C) \div (100 - C) \tag{1}$$

(in the above formula, $\alpha$ denotes a phase separation point depression constant (° C.), $T_C^0$ denotes a crystallizing point (° C.) of the thermoplastic resin, $T_C$ denotes a thermally-induced solid-liquid phase separation point (° C.) of the composition, and C denotes a concentration (% by weight) of the thermoplastic resin in the composition).

The first group consists of dimethyl phthalate, diethyl phthalate (DEP), dipropyl phthalate, diisopropyl phthalate, dibutyl phthalate (DBP), diisobutyl phthalate, diamyl phthalate (DAP), dicyclohexyl phthalate (DCHP), trimethyl trimellitate, tripropyl trimellitate, tributyl trimellitate, dimethyl malonate, diethyl malonate, dipropyl malonate, diisopropyl malonate, dibutyl malonate, dimethyl succinate, diethyl succinate, dipropyl succinate, diisopropyl succinate, dibutyl succinate, diamyl succinate, dimethyl adipate, diethyl adipate, dipropyl adipate, diisopropyl adipate, dibutyl adipate, diisobutyl adipate, dimethyl sebacate, diethyl sebacate, dibutyl sebacate, trimethyl phosphate, triethyl phosphate, tributyl phosphate, triamyl phosphate, triacetin, tripropionin, tributyrin, tricaproin, dimethyl sulfoxide, dimethylformamide, dimethylacetamide, ε-caprolactam, ε-caprolactone, γ-butyrolactone, N-methylpyrrolidone, cyclohexanone, ethylene carbonate, propylene carbonate, acetophenone, ethylene glycol diacetate, and ethylene glycol dipropionate.

The second group consists of diheptyl phthalate, di-n-octyl phthalate, di-2-ethylhexyl phthalate, di-n-nonyl phthalate, diisononyl phthalate, diisodecyl phthalate, ditridecyl phthalate, tri-2-ethylhexyl trimellitate, di-2-ethylhexyl adipate, diisononyl adipate, diisodecyl adipate, di-2-ethylhexyl azelate, di-n-octyl sebacate, di-2-n-ethylhexyl sebacate and tri-2-ethylhexyl phosphate.

The lower limit of the content of the thermoplastic resin in the composition containing the thermoplastic resin and the plasticizer in the present invention is preferably not less than 10% by weight, more preferably not less than 15% by weight, especially preferably not less than 20% by weight. The upper limit of the content of the thermoplastic resin is preferably not more than 90% by weight, more preferably not more than 80% by weight, further preferably not more than 70% by weight, especially preferably not more than 60% by weight. If the concentration of the resin is less than 10% by weight, membrane strength is deteriorated. If the concentration of the resin exceeds 90% by weight, the pore diameter tends to become too small and permeation performance tends to be deteriorated.

A first method for uniformly melting the composition containing the thermoplastic resin and the plasticizer in the present invention comprises introducing the resin into a continuous resin kneading apparatus such as an extruder, and introducing the plasticizer at a certain ratio as h eat melting the resin to carry out screw kneading of them, thereby obtaining a uniform solution. The form of the resin introduced may be any of powder, granule and pellet. When uniform melting is carried out by this method, the plasticizer is preferably in liquid form at room temperature. A single-screw extruder, a different direction twin-screw extruder, a same direction twin-screw extruder, or the like may be used as the extruder.

A second method for uniformly melting the composition containing the thermoplastic resin and the plasticizer comprises previously mixing and dispersing the resin and the plasticizer using a stirring apparatus such as a Henschel mixer and introducing the resulting composition into a continuous resin kneading apparatus such as an extruder to knead the composition, thereby obtaining a uniform solution. The form of the composition introduced is a slurry in the case of the plasticizer being liquid at room temperature, and a powder or granule in the case of the plasticizer being solid at room temperature.

A third method for uniformly melting the composition containing the thermoplastic resin and the plasticizer is a method of using a simple resin kneading apparatus such as a Brabender or a mill, or a method of melt kneading in other batch type kneading containers. According to this method, since the step is batch type, productivity is not high, but there are merits of simplicity and high flexibility.

A first method of cooling and solidifying to mold the composition comprises extruding a uniform solution containing the thermoplastic resin and the plasticizer into a sheet through a T-die or the like, and allowing the sheet to contact with a heat conductor to cool the sheet to a temperature sufficiently lower than the thermally-induced solid-liquid phase separation point. As the heat conductor, there may be used metals, water, air or the plasticizers per se, and especially preferred is to carry out the cooling by allowing the sheet to contact with a roll made of a metal due to high workability. Moreover, if the sheet is subjected to calender processing or hot rolling by nipping between rolls at the time of allowing the sheet to contact with a roll made of a metal, the heat conducting efficiency is further enhanced and the surface smoothness of the sheet is improved. Thus, this is preferred.

A second method of cooling and solidifying to mold the composition comprises extruding a uniform solution of the resin and the plasticizer into a tube or a hollow fiber through a circular die or a ring spinneret, and leading the extruded product into a coolant bath and/or passing a coolant through the tube or the hollow fiber, thereby cooling to a temperature sufficiently lower than the thermally-induced solid-liquid phase separation point to solidify the tube or the hollow fiber.

A third method of cooling and solidifying to mold the composition comprises extruding a uniform solution of the resin and the plasticizer into a sheet and dipping the sheet in a coolant bath or compressing the sheet by a cooling press or the like, thereby cooling to a temperature sufficiently lower than the thermally-induced solid-liquid phase separation point to solidify the sheet.

The coolant in the coolant bath is preferably one which does not dissolve the thermoplastic resin and can readily perform heat exchange, and water is preferred. The coolant which is introduced into the inside of the hollow fiber in the case of extruding into a hollow fiber has the effect of stabilizing the sectional shape of the hollow fiber, namely, holding the shape of true circle and inhibiting formation of irregular wall thickness, and various liquids are employed in addition to air.

The cooling rate in cooling and solidifying the melt of the composition must be not lower than 50° C./min, and is preferably $100-1\times10^{5\circ}$ C./min, more preferably $200-2\times10^{4\circ}$ C./min. If the cooling rate is lower than 50° C./min, the spherulites become coarse, and, besides, many inter-spherulitic voids tend to be formed, resulting in loss of uniformity of pore diameter or deterioration of strength.

In the present invention, extraction solvents are used for removing the plasticizer. The extraction solvents are preferably poor solvents for the thermoplastic resin and good solvents for the plasticizer, and, preferably, they have boiling points lower than the melting point of the microporous membrane. Examples of the extraction solvents include hydrocarbons such as hexane, cyclohexane, etc., halogenated hydrocarbons such as methylene chloride, 1,1,1-trichloroethane, etc., alcohols such as ethanol, isopropanol, etc., ethers such as diethyl ether, tetrahydrofuran, etc., ketones such as acetone, 2-butanone, etc., and water.

In the present invention, a first method for removing the plasticizer comprises dipping the microporous membrane cut into a given size in the extraction solvent in a container, followed by sufficient washing and subsequent drying of the deposited solvent by air-drying or with hot air. In this case, when the operation of dipping or washing is repeatedly carried out, the plasticizer remaining in the microporous membrane decreases and, hence, this is preferred. Moreover, preferably the end portions of the microporous membrane are restrained for inhibiting shrinkage of the microporous membrane during a series of the operations of dipping, washing and drying.

A second method for removing the plasticizer comprises continuously feeding the microporous membrane into a tank filled with the extraction solvent, dipping it for a period long enough to remove the plasticizer and then drying the deposited solvent. In this case, extraction efficiency is preferably enhanced in the case of applying known means such as a multi-stage method, according to which the microporous membrane is successively fed into the respective tanks having differences in concentration by dividing the inside of the tank into multi-stages, and a countercurrent method, according to which the extraction solvent is supplied in the direction opposite to the running direction of the microporous membrane, thereby forming a concentration gradient. In the first and second methods, it is important to perform substantial removal of the plasticizer from the microporous membrane. The substantial removal means that the plasticizer in the microporous membrane is removed to such an extent as not to damage the performance as a separating membrane, and the amount of the plasticizer remaining in the microporous membrane is preferably less than 1% by weight, more preferably less than 100 ppm by weight. The amount of the plasticizer remaining in the microporous membrane can be determined by gas chromatography, liquid chromatography or the like. Furthermore, when the extraction solvent is heated to a temperature within the range lower than the boiling point of the solvent, diffusion of the plasticizer and the solvent can be accelerated and extraction efficiency can be enhanced, and thus this is further preferred.

In the present invention, it is preferred to carry out a heat treatment, and the heat treatment exhibits the effects such as diminishment of shrinkage of the microporous membrane upon removal of the plasticizer and improvement of strength and heat resistance of the microporous membrane. As the method of the heat treatment, there is a method of placing the microporous membrane in hot air, a method of dipping the microporous membrane in a heating medium, or a method of contacting the microporous membrane with a metallic roll heated and controlled in temperature.

The temperature of the heat treatment in the present invention is preferably $(T_M^0-100)-(T_M^0)°$ C., more preferably $(T_M^0-50)-(T_M^0-5)°$ C., and most preferably $(T_M^0-30)-(T_M^0-10)°$ C., with respect to the crystalline melting point $T_M^0$ of the thermoplastic resin. If the temperature of the heat treatment is lower than $(T_M^0-100)°$ C., the effect of the heat treatment cannot be obtained, and if it exceeds $(T_M^0)°$ C., micropores of the microporous membrane are blocked to lose permeability, and thus these are not preferred.

In the present invention, it is preferred to carry out hydrophilizing treatment, and hydrophilic properties can be imparted to the microporous membrane thereby, and thus microporous membranes suitable for medical separating membranes, which should not adsorb proteins, can be obtained. As the method of hydrophilization, mention may be made of, for example, treatment with surface active agents, grafting, mixing or coating with hydrophilic polymers, and the like. The grafting is most preferred, taking into consideration durability of hydrophilic properties or possibility of leakage of the hydrophilic additives.

As the treatment with surface active agents, mention may be made of a method of impregnating the microporous membrane with a solution into which a surface active agent is dissolved and then evaporating the solvent.

For the grafting, there is a method of generating radicals by irradiating the microporous membrane with electron rays or gamma rays, or by using peroxides to carry out chemical modification of hydrophilic monomers such as hydroxyalkyl acrylates or hydroxyalkyl methacrylates.

For mixing or coating with hydrophilic polymers, there are: a method of producing the microporous membrane by mixing a hydrophilic polymer with the thermoplastic resin of the present invention, a method of impregnating the microporous membrane with a solution into which a hydrophilic polymer is dissolved and then evaporating the solvent, and the like.

In the present invention, further additional treatments may be carried out as long as the advantages of the present invention are not damaged. Examples of the additional treatments include a cross-linking treatment with ionizing radiations and the like, introduction of functional groups by chemical surface modification, and the like.

The composition containing the thermoplastic resin and the plasticizer used in the present invention may further contain antioxidants, crystal nucleating agents, antistatic agents, flame retardants, lubricants, ultraviolet absorbers, etc. depending on the purposes.

The microporous membranes having heat resistance of the present invention can be utilized for a wide variety of applications such as medical separating membranes usable for removal of viruses, bacteria, etc., concentration, or culture media, filters for industrial process for removal of fine particles from medical fluids, waste water, etc., separating membranes for separation of oil and water or liquid and gas, separating membranes for purification of tap water or sewage, separators for lithium batteries, etc., solid electrolyte supports for polymer batteries, and other applications.

The present invention will be explained in detail by the following examples. The test methods shown in the examples are as follows.

(1) Membrane thickness t:

Thickness of microporous membrane in the form of a sheet was measured using a dial gauge (PEACOCK NO. 25 manufactured by Ozaki Seisakusho Co., Ltd.).

Thickness of microporous membrane in the form of a hollow fiber was measured by photographing a vertically cut section of the membrane by a stereomicroscope and calculating ½ of the difference between the outer diameter and inner diameter of the hollow fiber.

(2) Porosity $\epsilon$:

Volume ($cm^3$) and weight (g) of the microporous membrane were measured, and the porosity $\epsilon$ (%) was calculated from the results of the measurements using the following formula.

Porosity=100×(1−weight÷(density of resin×volume))

(3) Water permeation amount W:

Permeation flux (mL) of pure water at 25° C. was measured, and water permeation amount W ($L/m^2/atm/hr/100$ μm) was calculated by the following formula from membrane thickness (μm), sample area ($cm^2$), differential pressure (atm), and measuring time (min).

Water permeation amount $W$=6×permeation flux× membrane thickness÷(sample area×differential pressure×measuring time).

(4) Gas permeability G:

A time required for permeation of 100 $cm^3$ of air was obtained using a Gurley gas permeability meter in accordance with JIS P-8117, and was standardized to a membrane thickness of 100 μm to obtain a gas permeability G ($sec/in^2/cmHg/100$ $cm^3/100$ μm).

(5) Maximum pore diameter $D_1$:

Maximum pore diameter $D_1$ (μm) was converted from bubble point ($kgf/cm^2$) obtained by the bubble point method.

(6) Apparent pore diameter $D_2$ according to permeation method:

The relation between gas permeability G and pore diameter d (μm) is as shown by the following formula using membrane thickness t (μm), porosity $\epsilon$ (%) and path curving rate τ:

$G=7.649 \times t \times \tau^2 \div (\epsilon \times d)$

On the other hand, the relation between water permeation amount W and pore diameter d is as shown by the following formula using membrane thickness t (μm), porosity $\epsilon$ (%) and path curving rate τ:

$W=1.138 \times 10^7 \times d^2 \times \epsilon \div (\tau^2 \times t)$

When τ, $\epsilon$ and t are eliminated, the pore diameter d can be shown by the following formula. Gas permeability G and water permeation amount W were measured, and apparent pore diameter $D_2$ (μm) according to the permeation method was calculated from the following formula.

$d=1.149 \times 10^{-8} \times W \times G = D_2$ (7) Ratio of maximum pore diameter and apparent pore diameter:

The ratio of the maximum pore diameter $D_1$ and the apparent pore diameter $D_2$ measured by the permeation method was defined as shown by the following formula, and this was taken as indication of uniformity of pore diameter.

Ratio of maximum pore diameter and apparent pore diameter=maximum pore diameter÷apparent pore diameter according to permeation method (8) Tensile break strength and tensile break elongation:

A tensile test was conducted under the test conditions of width of test piece of 10 mm, length of test piece of 100 mm, distance between chucks (distance between two gage marks) of 50 mm, pulling rate of 200 mm/min, and measuring temperature of 23±2° C. using Autograph Model AG-A manufactured by Shimadzu Construction Co., Ltd. The break strength (kgf/cm$^2$) and the break elongation (%) were obtained from the breaking load (kgf), breaking elongation (mm) and membrane thickness (μm) by the following formulae.

Tensile break strength=breaking load÷membrane thickness×10$^4$

Tensile break elongation=breaking elongation×2

(9) Thrusting strength and thrusting depth:

A thrusting test was conducted under the test conditions of bend radius of needle tip of 0.5 mm, thrusting speed of 2 mm/sec, and measuring temperature of 23±2° C. using a compression tester KES-G5 manufactured by Katoteck Co., Ltd., and a correlation curve between the load and the depth was obtained. From the maximum load (gf) at breaking point in the correlation curve and the membrane thickness (μm), the thrusting strength (gf/100 μm) standardized to a membrane thickness of 100 μm was obtained by the following formula.

Thrusting strength=100×maximum load÷membrane thickness

Furthermore, depth of the needle at the breaking point in the above thrusting test was defined to be thrusting depth (mm).

(10) Energy in the thrusting test:

In the correlation curve between the load (gf) and the depth (mm) obtained in the above thrusting test, the region of from starting point (depth 0 mm) to breaking point (thrusting depth) was integrated and standardized to a membrane thickness of 100 μm and the resulting value was defined to be energy (mJ/100 μm).

(11) Burst strength:

A microporous membrane in the form of a hollow fiber of 10 cm in effective length as a sample was fixed at a jig using an epoxy resin and fitted to a nitrogen gas cylinder having a regulator. Then, the pressure was increased by every 1 kgf/cm$^2$ by the regulator, and the sample was maintained for 1 minute at each of the pressures and the occurrence of bursting was judged. The burst strength (1 kgf/cm$^2$) was calculated by the following formula from the burst pressure (1 kgf/cm$^2$), membrane thickness (μm) and inner diameter of the hollow fiber (μm)

Burst strength=0.5×burst pressure×inner diameter÷membrane thickness

(12) Observation of sectional structure of microporous membrane:

A microporus membrane cut into a suitable size was impregnated with ethanol, and the section was exposed by freeze cutting at liquid nitrogen temperature. This sample was fixed on a sample stand with an electrically conductive double-coated tape, followed by coating with gold to obtain a sample for microscopic examination. The sectional structure of the microporous membrane was observed using a high resolution scanning electron microscope device (HRSEM) under an accelerating voltage of 5.0 kV and at a given magnification.

With reference to the layer defined by the following (A) and the layer defined by the following (B), the above sectional structure was photographed with changing the magnification to at least 4 stages from such an enlarging magnification as the whole image in the direction of membrane thickness being included within the frame of layout (for example, 400× is suitable when the membrane thickness is about 200 μm) to an enlarging magnification of 15000×, and judgment was conducted. Such layer as the inter-spherulitic voids schematically shown in FIG. 11 being not present in any of the photographs taken with changing the enlarging magnification is defined as layer (A), and such layer as the inter-spherulitic voids being present is defined as layer (B). In the case of the microporous membrane having a sectional structure in which the layer (A) and the layer (B) coexist, generally the layer (A) tends to be formed as a layer parallel to the surface of the microporous membrane in the surface layer portion of the microporous membrane, and the layer (B) tends to be formed in the inner layer portion of the microporous membrane.

The ratio of the layer (A) and the layer (B) was obtained as the average value of measurements of the ratio of thickness of the layers to the membrane thickness at, at least, 10 points in the above photographs of the sectional structure.

(A) A layer in which the micropores are intra-spherulitic voids.

(B) A layer in which the micropores are intra-spherulitic voids and inter-spherulitic voids.

(13) Detection of spherulites:

A microporous membrane was thinly sliced to prepare a thin piece, which was impregnated with an organic solvent which does not erode the microporous membrane, and, immediately thereafter, observation of a Maltese cross was conducted using a polarizing microscope. As the organic solvent, methylene chloride was used for the microporous membrane made of polyvinylidene fluoride resin. The enlarging magnification is preferably at least 200×, and more preferably at least 400×, and the higher magnification is preferred. A typical embodiment of the Maltese cross (cross-shaped polarization image) is shown in FIG. 12. In this way, spherulites can be detected by observing the polarization images in the form of Maltese crosses.

Figure 1:
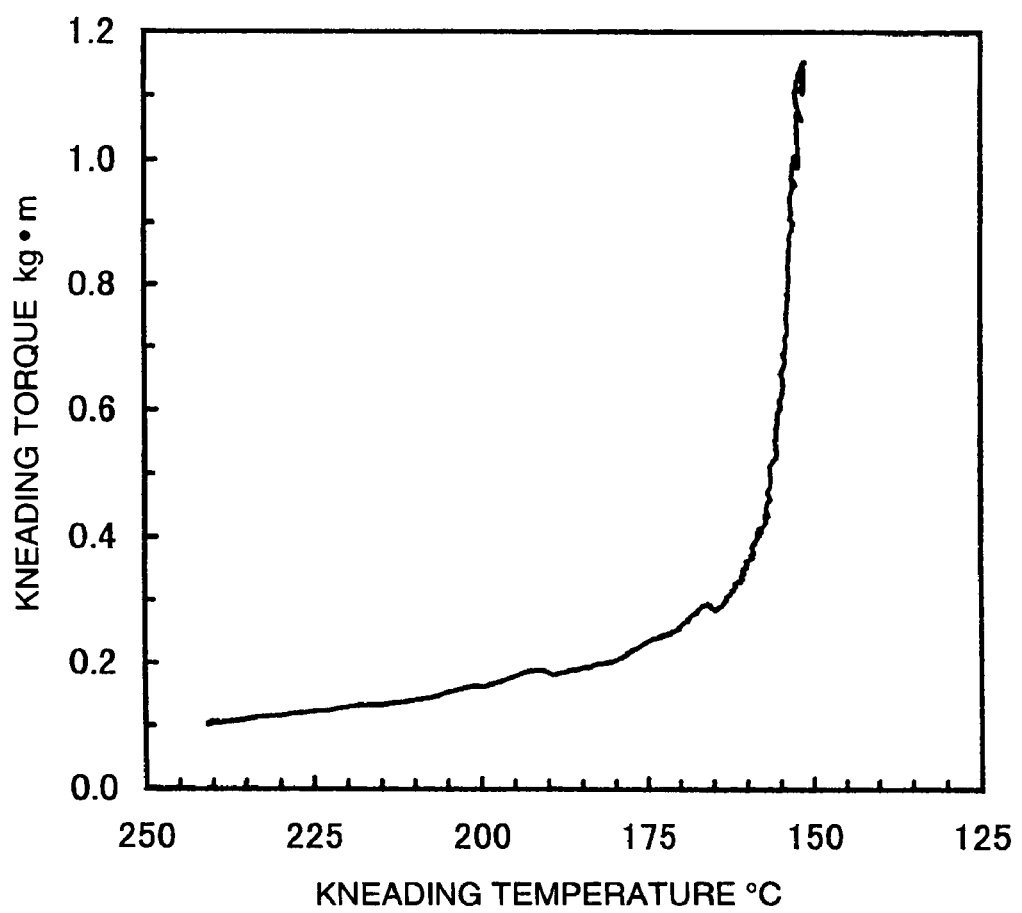
FIG. 1 is a characteristic diagram illustrating the change of kneading torque with lowering of kneading temperature of a mixture comprising a polyvinylidene fluoride resin and a plasticizer which is identified to be thermally-induced solid-liquid phase separation shown in Reference Example 1 of the present invention.

(14) Identification of phase separation mechanism:

Labo plastmill manufactured by Toyo Seiki Seisakusho Co., Ltd. (Model 30C150) equipped with a twin-screw (Model R100H) was used as a kneading apparatus. A composition comprising the thermoplastic resin, the plasticizer, etc. in admixture at a given ratio was introduced into the Labo plastmill, and melt kneaded at a given temperature and at a screw revolution of 50 rpm. In this case, although the kneading time can be freely chosen, preferably 5-10 minutes is preferred taking into consideration the time required for stabilization of kneading torque and inhibition of decomposition and deterioration of the resin. Then, the number of screw revolutions was set at 10 rpm, and continuing the screw kneading, the heater was cut off to air-cool the kneaded product, thereby measuring the correlation between kneading temperature (° C.) and kneading torque (kg·m) to obtain a characteristic curve. In the characteristic curve, the temperature at which the kneading torque abruptly rises with cooling can be regarded to be an inflection point in the solid liquid phase separation. In general, when a composition comprising polyvinylidene fluoride resin and a plasticizer is used, the inflection point with the solid-liquid phase separation is present in the range of about 100° C. to about 170° C. as shown in Reference Example 1 and FIG. 1 referred to hereinafter. However, the composition sometimes has a temperature at which the kneading torque abruptly lowers with cooling in the temperature range higher than the inflection point with solid-liquid phase separation, and this can be identified to be a liquid-liquid phase separation system. Therefore, a phase separation system having the temperature at which the kneading torque abruptly rises with cooling, and having no temperature at which the kneading torque abruptly lowers with cooling in the temperature range higher than the temperature at which the kneading torque abruptly rises is defined to be a thermally-induced solid-liquid phase separation.

(15) Thermally-induced solid-liquid phase separation point $T_C$, crystallizing point $T_C^0$, and crystalline melting point $T_M^0$:

A composition comprising the thermoplastic resin, the plasticizer, etc. in admixture at a given ratio was introduced into a Labo plastmill, and melt kneaded at a given temperature and at a screw revolution of 50 rpm to prepare a mixture. This mixture was used as a measuring sample. Using a thermal analysis apparatus (DSC-Pyrisl) manufactured by Perkin-Elmer Co., Ltd., an exothermic peak temperature in the course of cooling was measured under the conditions of a sample weight of 5-10 mg, a cooling rate of 10° C./min, and a scanning temperature optionally selectable from the range of 20-300° C. This was defined to be the thermally-induced solid-liquid phase separation point $T_C$ (° C.). The crystallizing point $T_C^0$ (° C.) of the thermoplastic resin was also measured in the same manner as in the measurement of the thermally-induced phase separation point. As for the crystalline melting point $T_M^0$ (° C.) of the thermoplastic resin, an endothermic peak in the course of heating of the second cycle was measured with the heating rate and the cooling rate being set at 10° C./min, and this was defined to be the crystalline melting point $T_M^0$.

(16) Cooling rate:

The cooling rate in the case of solidification in a coolant bath such as water upon cooling and solidification was obtained in the following manner using an infrared thermometer. A colorless and transparent composition in molten state was cooled by exposure to cold air. A temperature at which the composition solidified with crystallization to become white in color was measured using an infrared thermometer, and a solidification temperature (° C.) was determined. Then, a temperature of the composition just before cooling and solidification in a coolant bath was measured using an infrared thermometer, and this was taken as an initial temperature (° C.). Furthermore, solidification time (in seconds) was measured from the moment when the composition was allowed to contact with the coolant bath to the moment when the color of the composition changed to white by cooling and solidification. The cooling rate (° C./min) was calculated by the following formula.

Cooling rate=60×(initial temperature−solidification temperature)÷solidification time.

Furthermore, the cooling rate in case a mold such as a cooling press was utilized in cooling and solidification was obtained by inserting a thermocouple sensor into the composition in molten state and measuring the temperature and the time.

Reference Example 1

40% by weight of a polyvinylidene fluoride resin (homopolymer; weight average molecular weight: 250,000; density: 1.78 g/cm³; $T_M^0$=173° C.; $T_C^0$=148° C.) and 60% by weight of dicyclohexyl phthalate (DCHP) were mixed and the mixture was introduced into Labo plastmill. The mixture was melt kneaded for 5 minutes at a kneading temperature of 240° C. and a screw revolution of 50 rpm until the resin temperature and the kneading torque were stabilized. Then, the screw revolution was set at 10 rpm, and continuing the screw kneading, the heater was cut off to air-cool the uniform solution from the starting temperature of 240° C., thereby observing the change of the kneading torque with lowering of temperature, and evaluation of the phase separation mechanism was conducted. From the characteristic curve shown in FIG. 1, the phase separation mechanism of the composition was found to be a thermally-induced solid-liquid phase separation.

Example 1

Figure 2:
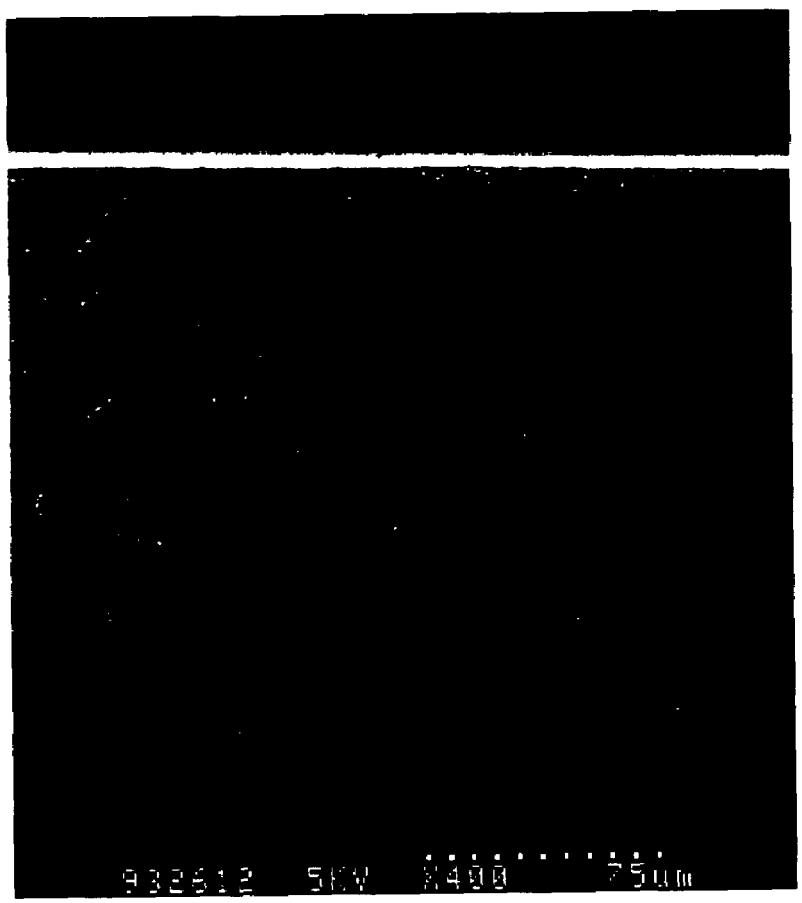
FIG. 2 is a scanning electron microphotograph (400× magnification) of the sectional structure of a microporous membrane obtained in Example 1 of the present invention.
Figure 3:
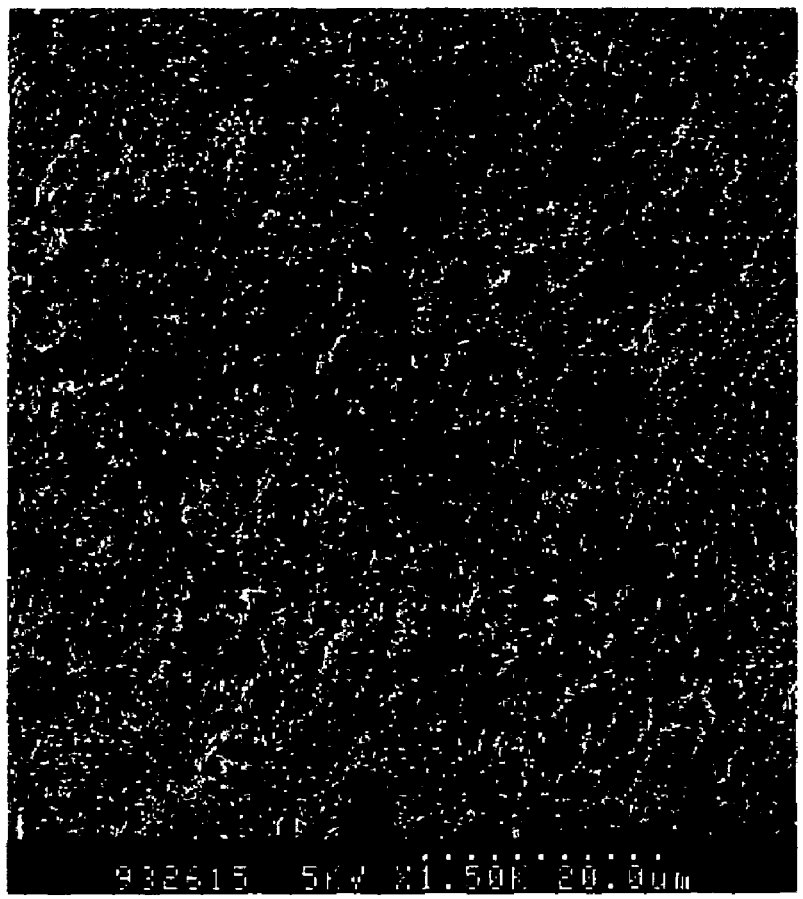
FIG. 3 is a scanning electron microphotograph (1500× magnification) of the sectional structure of a microporous membrane obtained in Example 1 of the present invention.
Figure 4:
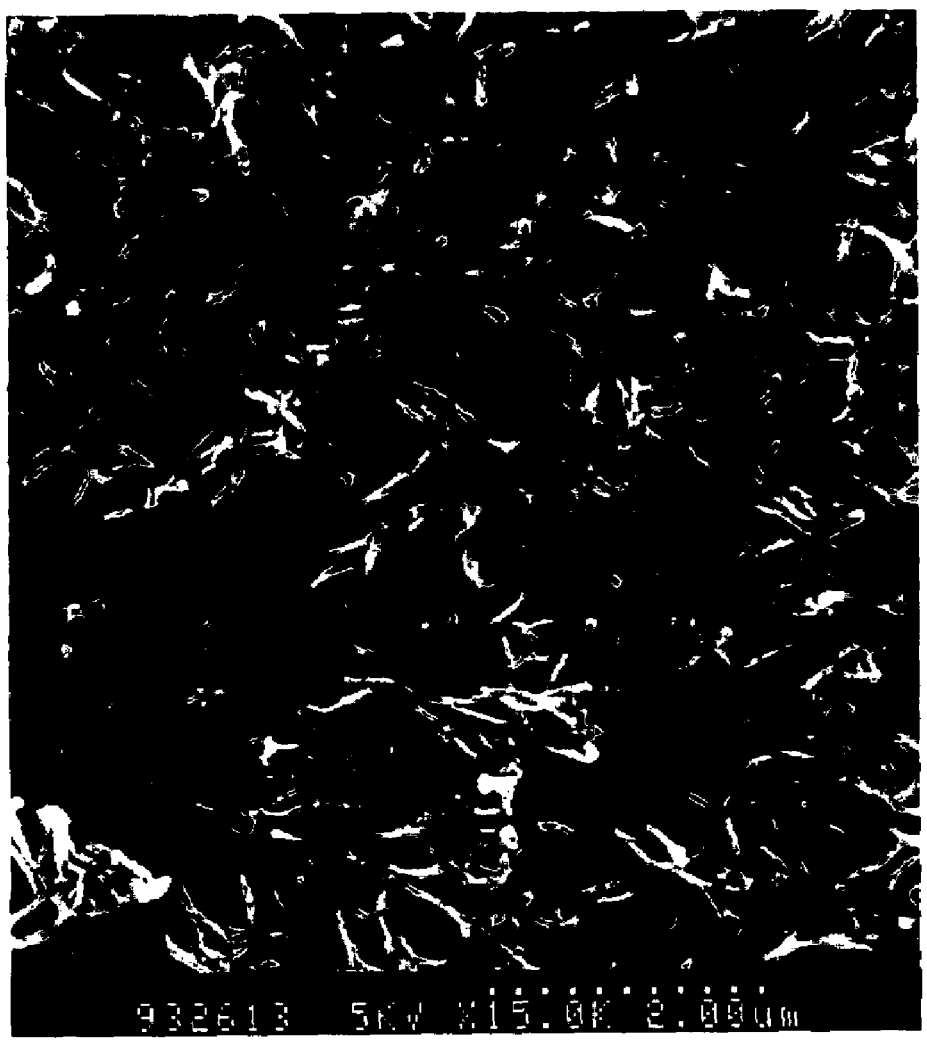
FIG. 4 is a scanning electron microphotograph (15000× magnification) of the sectional structure of a microporous membrane obtained in Example 1 of the present invention.

A composition comprising 40% by weight of a polyvinylidene fluoride resin (homopolymer; weight average molecular weight: 250,000; density: 1.78 g/cm³; $T_M^0$=173° C.; $T_C^0$=148° C.) and 60% by weight of dicyclohexyl phthalate (DCHP) was kneaded using a Labo plastmill for 10 minutes at a kneading temperature of 200° C. and a screw revolution of 50 rpm to obtain a uniform solution. The resulting uniform solution was molded into a sheet by a heating press of 200° C. and then cooled at a cooling rate of about 600° C./min by using a cooling press to solidify the sheet. Thereafter, dicyclohexyl phthalate was removed by extraction with hexane, and the deposited hexane was removed by drying to obtain a microporous membrane. The resulting microporous membrane was high in both the tensile break strength and the tensile break elongation, and since the ratio of maximum pore diameter and apparent pore diameter was small, namely, 4.9, it was found that uniformity of pore diameter was high. A thin piece of the resulting microporous membrane was prepared, and using a polarizing microscope, the polarization image thereof was observed to have Maltese crosses through the whole layer of the sectional structure of the microporous membrane, confirming that spherulites were present. FIG. 2, FIG. 3 and FIG. 4 show photographs of the sectional structure of the microporous membrane taken by a scanning electron microscope. It was found from the photographs of the sectional structure that in the resulting microporous membrane, the spherulites joined to each other without having boundaries and the layer (A) in which the micropores were intra-spherulitic voids occupied 100%. Results of measurements on the resulting microporous membrane are shown in Table 1.

Example 2

Figure 5:
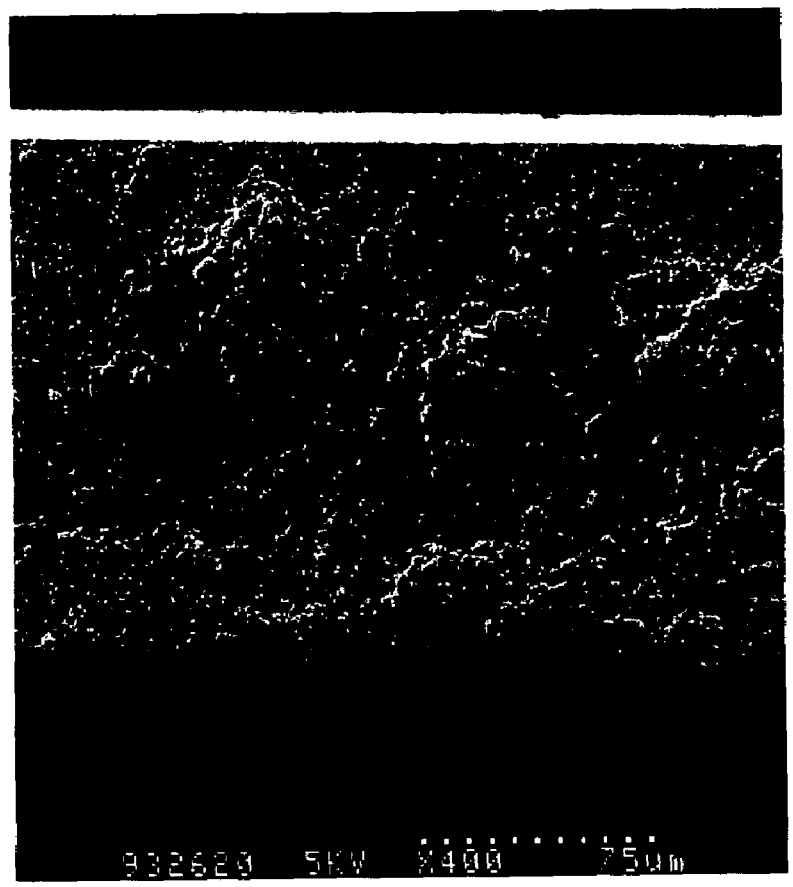
FIG. 5 is a scanning electron microphotograph (400× magnification) of the sectional structure of a microporous membrane obtained in Example 2 of the present invention.

A microporous membrane was obtained in the same manner as in Example 1, except that diamyl phthalate (DAP) was used as the plasticizer. A thin piece of the resulting microporous membrane was prepared, and using a polarizing microscope, the polarization image was observed to have Maltese crosses through the whole layer of the sectional structure of the microporous membrane, confirming that spherulites were present. Physical properties of the resulting microporous membrane are shown in Table 1, and a photograph of the sectional structure of the microporous membrane taken using a scanning electron microscope is shown in FIG. 5. It was found from the photograph of the sectional structure that in the sectional structure of the resulting microporous membrane, the layer (A) in which the micropores were intra-spherulitic voids occupied 39% and the layer (B) in which the micropores were intra-spherulitic voids and inter-spherulitic voids occupied 61%.

Comparative Example 1

Figure 6:
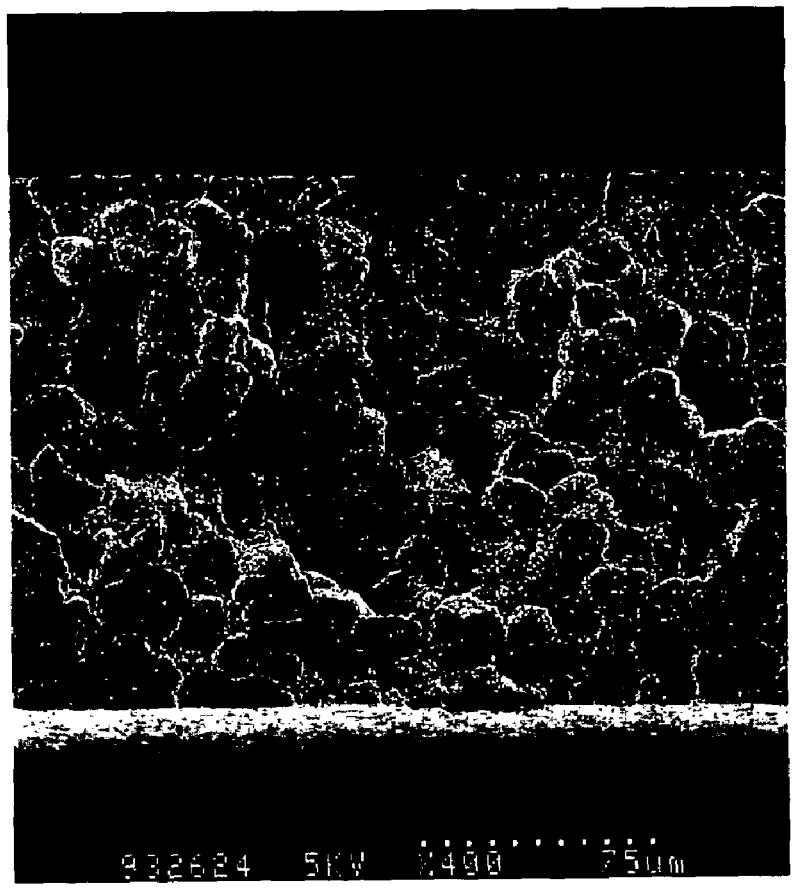
FIG. 6 is a scanning electron microphotograph (400× magnification) of the sectional structure of a microporous membrane obtained in Comparative Example 1 of the present invention.
Figure 7:
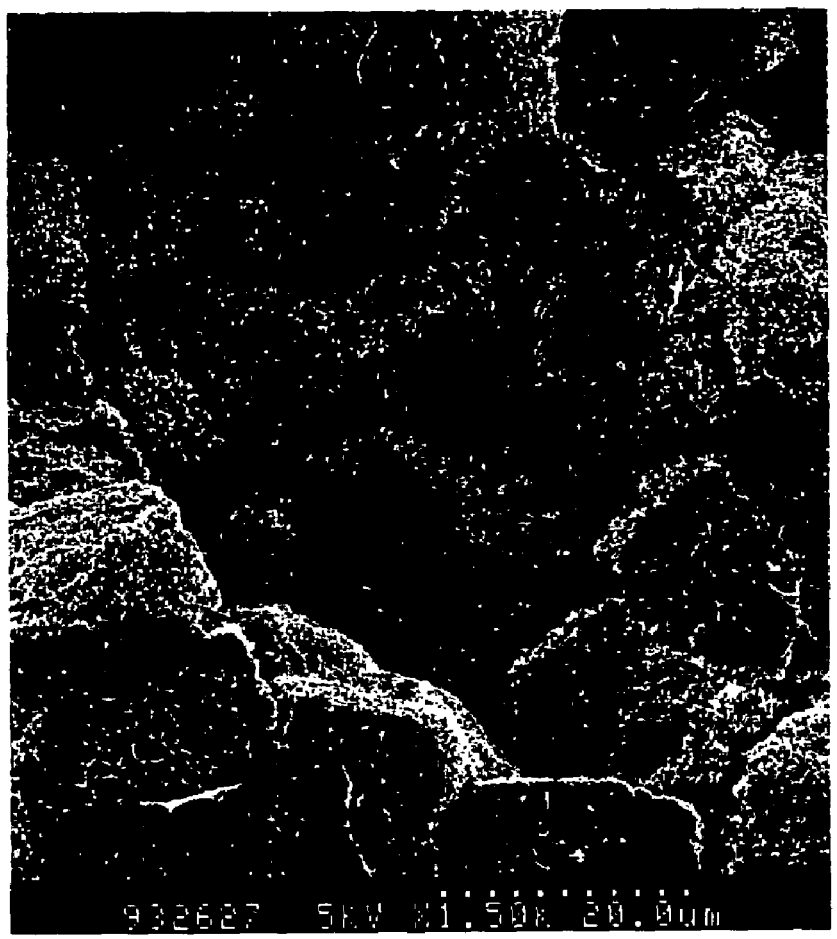
FIG. 7 is a scanning electron microphotograph (1500× magnification) of the sectional structure of a microporous membrane obtained in Comparative Example 1 of the present invention.

A microporous membrane was obtained in the same manner as in Example 1, except that dibutyl phthalate (DBP) was used as the plasticizer. A thin piece of the resulting microporous membrane was prepared, and using a polarizing microscope, the polarization image was observed to have Maltese crosses through the whole layer of the sectional structure of the microporous membrane and thus spherulites were present. Physical properties of the resulting microporous membrane are shown in Table 1. Photographs of the sectional structure of the microporous membrane taken using a scanning electron microscope are shown in FIG. 6 and FIG. 7. It was found from the photographs of sectional structure that in the sectional structure of the resulting microporous membrane, the layer (B) in which the micropores were intra-spherulitic voids and inter-spherulitic voids occupied 100%. Therefore, as shown in Table 1, strength and uniformity of pore diameter of the resulting microporous membrane were seriously inferior.

Comparative Example 2

A microporous membrane was obtained in the same manner as in Example 1, except that diethyl phthalate (DEP) was used as the plasticizer. Physical properties of the resulting microporous membrane are shown in Table 1. A thin piece of the resulting microporous membrane was prepared, and using a polarizing microscope, the polarization image was observed to have Maltese crosses through the whole layer of the sectional structure of the microporous membrane and thus it was ascertained that spherulites were present. It was found that in the sectional structure of the resulting microporous membrane, the layer (B) in which the micropores were intra-spherulitic voids and inter-spherulitic voids occupied 100%. Therefore, as shown in Table 1, strength and uniformity of pore diameter of the resulting microporous membrane were seriously inferior.

Example 3

Figure 8:
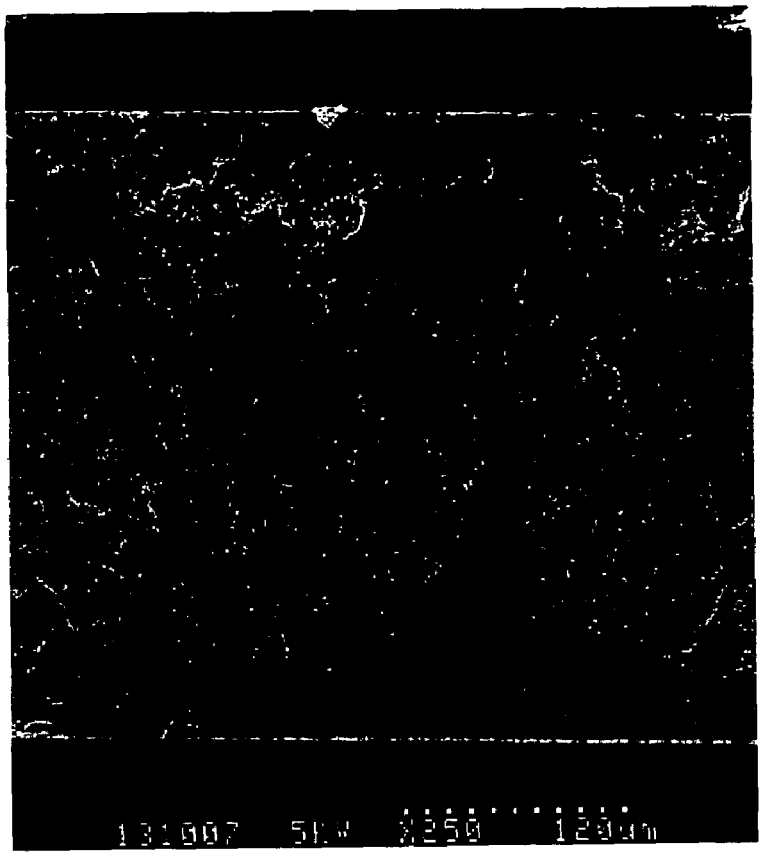
FIG. 8 is a scanning electron microphotograph (250× magnification) of the sectional structure of a microporous membrane obtained in Example 3 of the present invention.

A microporous membrane was obtained in the same manner as in Example 1, except that the cooling press was not used for cooling and solidification, but the sheet was introduced into water of 20° C. and cooled at a cooling rate of about 10000° C./min. Physical properties of the resulting microporous membrane are shown in Table 2, and a photograph of the sectional structure of the microporous membrane taken by a scanning electron microscope is shown in FIG. 8.

Comparative Example 3

Figure 9:
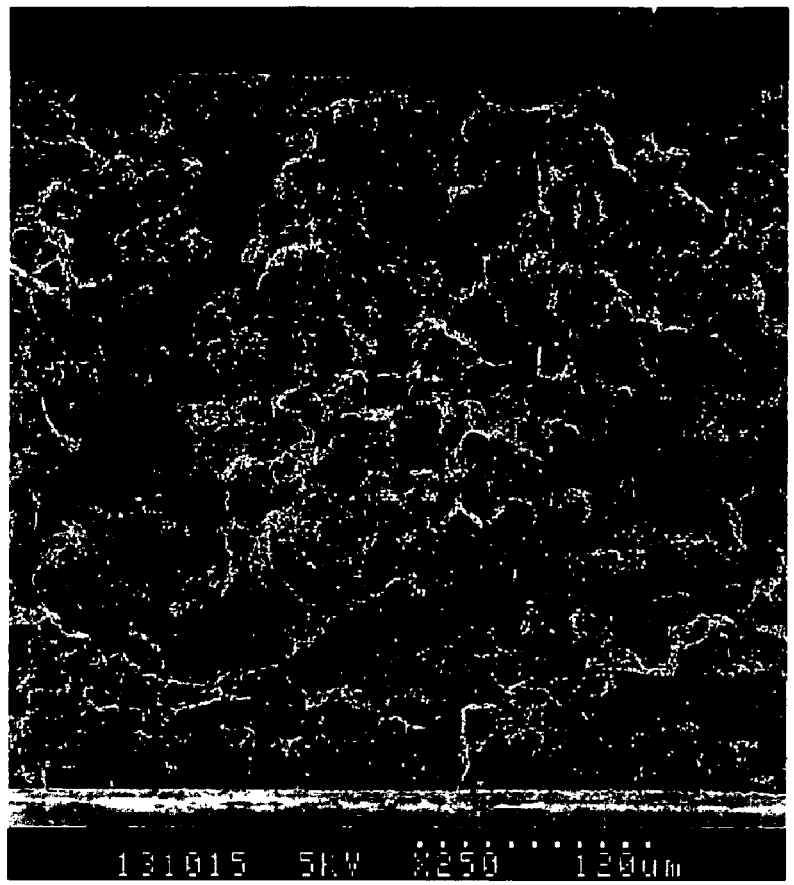
FIG. 9 is a scanning electron microphotograph (250× magnification) of the sectional structure of a microporous membrane obtained in Comparative Example 3 of the present invention.

A microporous membrane was obtained in the same manner as in Example 1, except that the cooling press was used for cooling and solidification, and the cooling rate was about 40° C./min. Physical properties of the resulting microporous membrane are shown in Table 2. A thin piece of the resulting microporous membrane was prepared, and using a polarizing microscope, the polarization image was observed to have Maltese crosses through the whole layer of the sectional structure of the microporous membrane and thus it was ascertained that spherulites were present. A photograph of the sectional structure of the microporous membrane taken by a scanning electron microscope is shown in FIG. 9. It was found from the photograph of the sectional structure that in the sectional structure of the resulting microporous membrane, the layer (B) in which the micropores were voids in spherulites and voids between spherulites occupied 100%. As shown in Table 2, when the cooling rate was lowered, strength and uniformity of pore diameter of the resulting microporous membrane were deteriorated.

Example 4

A microporous membrane was obtained in the same manner as in Example 3, except that amount of the polyvinylidene fluoride resin was 20% by weight and that of dicyclohexyl phthalate (DCHP) was 80% by weight. A thin piece of the resulting microporous membrane was prepared, and using a polarizing microscope, the polarization image was observed to have Maltese crosses through the whole layer of the sectional structure of the microporous membrane, and thus it was ascertained that spherulites were present. It was found that in the sectional structure of the resulting microporous membrane, the layer (A) in which the micropores were intra-spherulitic voids occupied 100%. Physical properties of the resulting microporous membrane are shown in Table 2.

Example 5

The composition used in Example 1 which comprised 40% by weight of a polyvinylidene fluoride resin and 60% by weight of dicyclohexyl phthalate (DCHP) was stirred and mixed at 70° C. using Henschel mixer, and then cooled to obtain a powder. This powder was introduced from a hopper and melt kneaded at 200° C. using a 35 mm twin-screw extruder to obtain a uniform solution. Subsequently, the resulting uniform solution was extruded from a coathanger die adjusted to a lip distance of 100 μm, and put between two cooling rolls and cooled and solidified to obtain a sheet. Thereafter, dicyclohexyl phthalate was removed by extraction with hexane, and the deposited hexane was removed by drying to obtain a microporous membrane. The cooling rate at cooling and solidification was about 1000° C./min. Moreover, heat induction type liquid-solid phase separation point of the mixture was 136° C., from which the phase separation point depression constant was calculated to be 20.0° C. A thin piece of the resulting microporous membrane was prepared, and using a polarizing microscope, the polarization image was observed to have Maltese crosses through the whole layer of the sectional structure of the microporous membrane, and thus it was ascertained that spherulites were present. The sectional structure of the resulting microporous membrane was observed using a scanning electron microscope to find that the layer (A) in which the micropores were intra-spherulitic voids occupied 100%. Physical properties of the resulting microporous membrane were a thickness of 380 μm, a porosity of 63%, a water permeation amount of 380 L/m$^2$/atm/hr/100 μm, a maximum pore diameter of 0.057 μm, a tensile break strength of 150 kgf/cm$^2$, and a tensile break elongation of 320%.

Example 6

A microporous membrane was obtained in the same manner as in Example 1, except that 45% by weight of polyvinylidene fluoride resin (SOLEF1012 having a crystalline melting point of 173° C. manufactured by SOLVAY Co., Ltd.) and 55% by weight of dicyclohexyl phthalate (DCHP) were used. The thermally-induced solid-liquid phase separation point of the mixture was 138° C., from which the phase separation point depression constant was calculated to be 18.2° C. A thin piece of the resulting microporous membrane was prepared, and using a polarizing microscope, the polarization image was observed to have Maltese crosses through the whole layer of the sectional structure of the microporous membrane, and thus it was ascertained that spherulites were present. It was found that in the sectional structure of the resulting microporous membrane, the layer (A) in which the micropores were intra-spherulitic voids occupied 100%. Physical properties of the resulting microporous membrane are shown in Table 3.

Example 7

A microporous membrane was obtained in the same manner as in Example 1, except that amount of the polyvinylidene fluoride resin was 50% by weight and that of dicyclohexyl phthalate (DCHP) was 50% by weight. The thermally-induced solid-liquid phase separation point of the mixture was 140° C., from which the phase separation point depression constant was calculated to be 16.0° C. A thin piece of the resulting microporous membrane was prepared, and using a polarizing microscope, the polarization image was observed to have Maltese crosses through the whole layer of the sectional structure of the microporous membrane, and thus it was ascertained that spherulites were present. It was found that in the sectional structure of the resulting microporous membrane, the layer (A) in which the micropores were intra-spherulitic voids occupied 100%. Physical properties of the resulting microporous membrane are shown in Table 3.

Comparative Example 4

A mixture comprising 17% by weight of a polyvinylidene fluoride resin (SOFEF1012 having a crystalline melting point of 173° C. manufactured by SOLVAY Co., Ltd.), 66% by weight of dimethylacetamide and 17% by weight of isopropyl alcohol was stirred and dissolved at 60° C. The resulting solution was cast on a glass plate at 50° C., and immediately immersed in a solution comprising 42% by weight of water, 51% by weight of dimethylacetamide and 7% by weight of isopropyl alcohol which was adjusted to 30° C. to coagulate the cast solution. This was successively washed with water and ethanol, and then dried to obtain a flat microporous membrane. Spherulites were not formed at the sectional structure of the resulting microporous membrane. Physical properties of the resulting microporous membrane are shown in Table 3.

Comparative Example 5

A mixture comprising 18% by weight of a polyvinylidene fluoride resin (SOFEF1012 having a crystalline melting point of 173° C. manufactured by SOLVAY Co., Ltd.), 72% by weight of dimethylacetamide and 10% by weight of polyethylene glycol (manufactured by Wako Jun-yaku Co., Ltd.; weight average molecular weight: 20,000) was stirred and dissolved at 55° C. The resulting solution was cast on a glass plate at 50° C., and immediately immersed in water adjusted to 30° C. to coagulate the cast solution. This was successively washed with water and ethanol, and then dried to obtain a flat microporous membrane. Spherulites were not formed at the sectional structure of the resulting microporous membrane. A dense skin layer was present on the surface of the microporous membrane.

Example 8

The composition used in Example 1 which comprised 40% by weight of polyvinylidene fluoride resin and 60% by weight of dicyclohexyl phthalate (DCHP) was stirred and mixed at 70° C. using a Henschel mixer, and then cooled to obtain a powder. This powder was introduced from a hopper and melt kneaded using a 35 mm twin-screw extruder at 200° C. to obtain a uniform solution. Subsequently, the resulting uniform solution was extruded into a hollow fiber from a spinneret comprising a ring orifice of 0.9 mm in inner diameter and 1.49 mm in outer diameter with passing air through the inside of the hollow, and cooled and solidified in a water bath of 20° C., followed by winding on a hank. Thereafter, dicyclohexyl phthalate was removed by extraction with hexane, and the deposited hexane was removed by drying to obtain a microporous membrane. The cooling rate at cooling and solidification was about 5000° C./min. Moreover, the thermally-induced solid-liquid phase separation point of the mixture was 136° C., from which the phase separation point depression constant was calculated to be 20.0° C. A thin piece of the resulting microporous membrane was prepared, and using a polarizing microscope, the polarization image was observed to have Maltese crosses through the whole layer of the sectional structure of the microporous membrane, and thus it was ascertained that spherulites were present. The sectional structure of the resulting microporous membrane was observed using a scanning electron microscope to find that the layer (A) in which the micropores were intra-spherulitic voids occupied 100%. Physical properties of the resulting microporous membrane were a thickness of 209 μm, a porosity of 62%, a water permeation amount of 270 L/m$^2$/atm/hr/100 μm, a maximum pore diameter of 0.053 μm, a tensile break strength of 170 kgf/cm$^2$, and a tensile break elongation of 400%.

Example 9

Figure 10:
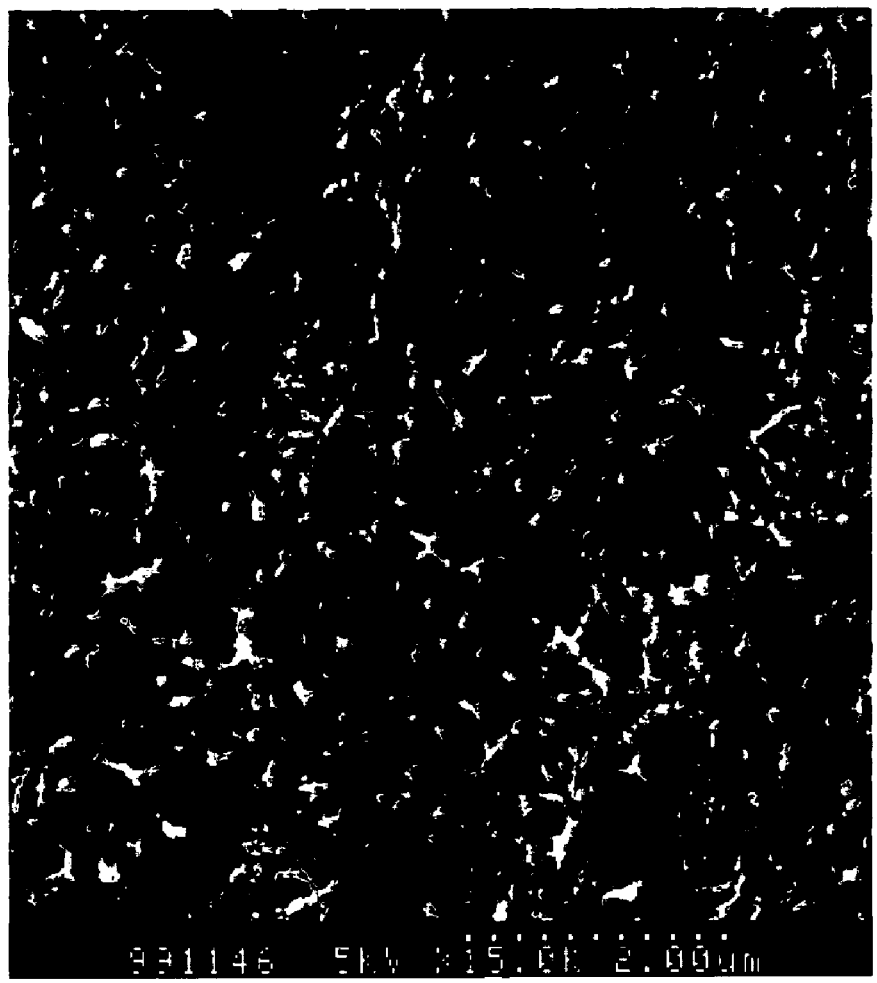
FIG. 10 is a scanning electron microphotograph (15000× magnification) of the sectional structure of a microporous membrane obtained in Example 9 of the present invention.

A microporous membrane was obtained in the same manner as in Example 8, except that 45% by weight of polyvinylidene fluoride resin (SOFEF1012 having a crystalline melting point of 173° C. manufactured by SOLVAY Co., Ltd.) and 55% by weight of dicyclohexyl phthalate (DCHP) were used. The thermally-induced solid-liquid phase separation point of the mixture was 138° C., from which the phase separation point depression constant was calculated to be 18.2° C. A thin piece of the resulting microporous membrane was prepared, and using a polarizing microscope, the polarization image was observed to have Maltese crosses through the whole layer of the sectional structure of the microporous membrane, and thus it was ascertained that spherulites were present. A photograph of the sectional structure of the microporous membrane taken using a scanning electron microscope is shown in FIG. 10. It was found that in the sectional structure of the resulting microporous membrane, the layer (A) in which the micropores were intra-spherulitic voids occupied 100%. Physical properties of the resulting microporous membrane are shown in Table 3.

Example 10

The microporous membrane in the form of a hollow fiber obtained in Example 8 was kept in an oven controlled to 150° C. for 30 minutes to carry out a heat treatment. Physical properties of the resulting microporous membrane were a thickness of 190 μm, a porosity of 58%, a water permeation amount of 150 L/m$^2$/atm/hr/100 μm, a maximum pore diameter of 0.051 μm, a tensile break strength of 200 kgf/cm$^2$, and a tensile break elongation of 310%. The tensile break strength was further higher in comparison with the microporous membrane obtained in Example 8. Moreover, when the resulting microporous membrane was left to stand in an autoclave for steam sterilization at 130° C. for 1 hour, the membrane showed no dimensional change and was excellent in heat resistance.

Comparative Example 6

A polyethylene resin (weight average molecular weight: 200,000; density: 0.96 g/cm$^3$; $T_M^0$: 135° C.) was introduced into a 35 mm twin-screw extruder from a hopper. Furthermore, liquid paraffin (kinematic viscosity at 37.8° C.: 13.4 cSt) was poured into the extruder so that the composition comprised 30% by weight of the polyethylene resin and 70% by weight of the liquid paraffin, and melt kneaded at 200° C. to obtain a uniform solution. Subsequently, the resulting uniform solution was extruded into a hollow fiber from a spinneret comprising a ring orifice of 0.9 mm in inner diameter and 1.49 mm in outer diameter with passing air through the hollow, and cooled and solidified in a water bath, followed by winding on a hank. Thereafter, liquid paraffin was removed by extraction with hexane, and the deposited hexane was removed by drying to obtain a microporous membrane. The cooling rate at cooling and solidification was about 5000° C./min. When the resulting microporous membrane was left to stand in an autoclave for steam sterilization at 130° C. for 1 hour, shrinkage in size of about 30% was seen and the membrane had no sufficient heat resistance.

Example 11

The microporous membrane in the form of hollow fiber obtained in Example 8 was subjected to irradiation with electron rays of 3 Mrad in a nitrogen-replaced atmosphere of 100 ppm in oxygen concentration, and immediately subjected to hydrophilizing treatment by a graft method. The hydrophilizing treatment was carried out by immersing the microporous membrane in a mixed solution comprising 6% by weight of 2-hydroxyethyl methacrylate, 20% by weight of t-butanol and 74% by weight of water at room temperature for 1 hour in a nitrogen-replaced atmosphere, followed by washing with water and drying. The resulting microporous membrane had such a high hydrophilicity as being spontaneously wetted when it was put in water, and was suitable for separating membranes for water treatment, medical separating membranes which should not adsorb proteins, and the like.

TABLE 1

| | Example 1 | Example 2 | Comparative Example 1 | Comparative Example 2 |
|---|---|---|---|---|
| Kind of plasticizer | DCHP | DAP | DBP | DEP |
| Concentration of resin C [wt %] | 40 | 40 | 40 | 40 |
| Thermally-induced solid-liquid phase separation point $T_c$ [° C.] | 136 | 131 | 122 | 116 |
| Phase separation point depression constant α [° C.] | 20.0 | 28.3 | 43.3 | 53.3 |
| Cooling rate [° C./min] | 600 | 600 | 600 | 600 |
| Membrane thickness t [μm] | 193 | 176 | 176 | 173 |
| Layer in which micropores are intra-spherulitic voids (A) [%] | 100 | 39 | 0 | 0 |
| Layer in which micropores are intra-spherulitic voids and inter-spherulitic voids (B) [%] | 0 | 61 | 100 | 100 |
| Porosity ε [%] | 64 | 58 | 53 | 47 |
| Gas permeability G [sec/in$^2$/cmHg/100 cm$^3$/100 μm] | 4170 | 2960 | 330 | 17 |
| Water permeation amount W [L/m$^2$/atm/hr/100 μm] | 330 | 530 | 1350 | 17700 |
| Maximum pore diameter $D_1$ [μm] | 0.078 | 0.131 | 0.683 | 0.933 |
| Apparent pore diameter $D_2$ according to permeation method [μm] | 0.016 | 0.018 | 0.0051 | 0.0035 |
| Ratio of maximum pore diameter and apparent pore diameter $D_1/D_2$ | 4.9 | 7.3 | 130 | 270 |
| Tensile break strength [kgf/cm$^2$] | 91 | 60 | 35 | 31 |
| Tensile break elongation [%] | 160 | 35 | 4 | 3 |

TABLE 2

| | Example 3 | Comparative Example 3 | Example 4 |
|---|---|---|---|
| Kind of plasticizer | DCHP | DCHP | DCHP |
| Concentration of resin C [wt %] | 40 | 40 | 20 |
| Thermally-induced solid-liquid phase separation point $T_c$ [° C.] | 136 | 136 | 126 |
| Phase separation point depression constant α [° C.] | 20.0 | 20.0 | 27.5 |
| Cooling rate [° C./min] | 10000 | 40 | 10000 |
| Membrane thickness t [μm] | 335 | 363 | 188 |
| Layer in which micropores are intra-spherulitic voids (A) [%] | 100 | 0 | 100 |
| Layer in which micropores are intra-spherulitic voids and inter-spherulitic voids (B) [%] | 0 | 100 | 0 |
| Porosity ε [%] | 60 | 68 | 82 |
| Gas permeability G [sec/in$^2$/cmHg/100 cm$^3$/100 μm] | 4800 | 2460 | 1550 |
| Water permeation amount W [L/m$^2$/atm/hr/100 μm] | 300 | 510 | 2070 |
| Maximum pore diameter $D_1$ [μm] | 0.055 | 0.247 | 0.120 |
| Apparent pore diameter $D_2$ according to permeation method [μm] | 0.020 | 0.014 | 0.037 |

TABLE 2-continued

|  | Example 3 | Comparative Example 3 | Example 4 |
|---|---|---|---|
| Ratio of maximum pore diameter and apparent pore diameter $D_1/D_2$ | 2.8 | 17 | 3.3 |
| Tensile break strength [kgf/cm$^2$] | 130 | 39 | 23 |
| Tensile break elongation [%] | 280 | 9 | 170 |

TABLE 3

|  | Example 6 | Example 7 | Comparative Example 4 | Comparative Example 5 | Example 8 | Example 9 |
|---|---|---|---|---|---|---|
| Form of microporous membrane | Flat membrane | Flat membrane | Flat membrane | Flat membrane | Hollow fiber | Hollow fiber |
| Concentration of resin [wt %] | 45 | 50 | 17 | 18 | 40 | 45 |
| Thermally-induced solid-liquid phase separation point Tc [° C.] | 138 | 140 | — | — | 136 | 138 |
| Phase separation point depression constant α [° C.] | 18.2 | 16.0 | — | — | 20.0 | 18.2 |
| Membrane thickness [μm] | 196 | 202 | 120 | 126 | 209 | 71 |
| Porosity [%] | 52 | 47 | 65 | 68 | 62 | 54 |
| Maximum pore diameter [nm] | 32 | 26 | 100 | 62 | 53 | 27 |
| Water permeation amount [L/m$^2$/atm/hr/100 μm] | 82 | 56 | 1250 | 850 | 270 | 87 |
| Thrusting strength [gf/100 μm] | 320 | 386 | 129 | 112 | — | — |
| Thrusting depth [mm] | 3.2 | 3.3 | 1.5 | 1.2 | — | — |
| Energy in thrusting test [mJ/100 μm] | 7.6 | 8.4 | 0.9 | 0.7 | — | — |
| Burst strength [kgf/cm$^2$] | — | — | — | — | 70 | — |
| Tensile break strength [kgf/cm$^2$] | 146 | 195 | 67 | 59 | 170 | 343 |
| Tensile break elongation [%] | 252 | 264 | 52 | 48 | 400 | 740 |

Note) - : Not measured

INDUSTRIAL APPLICABILITY

Since the heat resistant microporous membranes of the present invention have high strength and have a layer excellent in uniformity of pore diameter, it is expected that they have ideal fine particles removing performance and permeation performance. Moreover, it is also possible to provide microporous membranes having pore diameters effectively usable for removal of viruses. Thus, they are industrially very useful.

The invention claimed is:

1. A heat resistant microporous membrane characterized by:
    (1) comprising polyvinylidene fluoride resin spherulites;
    (2) having a maximum pore diameter of 10-150 nm as determined by a bubble point method; and
    (3) having a layer structure formed in the direction of membrane thickness, said layer structure containing 5-100% by thickness of a layer defined by the following (A) and 95-0% by thickness of a layer defined by the following (B):
        (A) a layer in which the spherulites are joined to each other without having boundaries and the micropores are intra-spherulitic voids, said intra-spherulitic voids do not form a layer of porous fused or compressed structure", and
        (B) a layer in which void spaces are present with forming boundaries among the adjacent spherulites and the micropores are intra-spherulitic voids and inter-spherulitic voids.

2. A heat resistant microporous membrane according to claim 1, which has a maximum pore diameter of 10-50 nm as determined by a bubble point method.

3. A heat resistant microporous membrane according to claim 1, wherein said layer structure contains 30-100% of a layer defined by (A) and 70-0% of a layer defined by (B).

4. A heat resistant microporous membrane according to claim 1, which has a porosity of 30-90%.

5. A heat resistant microporous membrane according to claim 1, which has a water permeation amount of 50–5×10$^3$ L/m$^2$/atom/hour 100 Φm.

6. A heat resistant microporous membrane according to claim 1, which has a tensile break strength of 20-500 kgf/cm$^2$ in at least a uniaxial direction and/or a tensile break elongation of 30-1000% in at least said uniaxial direction.

7. A heat resistant microporous membrane according to claim 1, wherein:

said layer (A) is a layer in which the micropores are intra-spherulitic voids formed by minute droplets of a plasticizer left within the spherulites when the resin undergoes solid-liquid phase separation to produce crystals and the intra-spherulitic voids communicate to each other to form three-dimensional pore paths, and said layer (B) is a layer in which the micropores are intra-spherulitic voids and inter-spherulitic voids produced as liquid reservoirs among adjacent spherulites by exclusion of a plasticizer from the spherulites when the resin undergoes solid-liquid phase separation to produce crystals and the inter-spherulitic voids communicate to each other to form three-dimensional pore paths.

8. A heat resistant microporous membrane according to claim 1, which is produced by a method comprising heating a composition containing a polyvinylidene fluoride resin and plasticizer and having a thermally-induced solid-liquid phase separation point to uniformly melt the composition, cooling the melt at a cooling rate of not lower than 50° C./min. to solidify the melt, and then removing a substantial part of said plasticizer, where said composition has a phase separation point depression constant ($\alpha$) of 0-40° defined by the following formula (1):

$$\alpha = 100 \times (T_C^0 - T_C) \div (100 - C) \quad (1)$$

wherein a denotes a phase separation point depression constant (>C), $T_C^0$) denotes a crystallizing point (° C.) of the polyvinylidene fluoride resin, $T_C$ denotes a thermally-induced solid-liquid phase separation point (° C.) of said composition, and C denotes a concentration (% by weight) of the polyvinylidene fluoride resin in the composition.

9. A heat resistant microporous membrane according to claim 1, which is produced by the use of dicyclohexyl phthalate or diamyl phthalate as plasticizer.

10. A heat resistant microporous membrane according to claim 1, which is heat-treated.

11. A heat resistant microporous membrane according to claim 8, which is heat-treated.

12. A heat resistant microporous membrane according to claim 1, which is hydrophilized.

13. A heat resistant microporous membrane according to claim 8, which is hydrophilized.

14. A heat resistant microporous membrane according to claim 10, which is hydrophilized.

15. A heat resistant microporous membrane according to claim 8, wherein cooling and solidifying the melt composition containing the polyvinylidene fluoride and the plasticizer is conducted by bringing the melt composition into contact with water.

* * * * *

UNITED STATES PATENT AND TRADEMARK OFFICE
CERTIFICATE OF CORRECTION

| | |
|---|---|
| PATENT NO. | : 7,635,513 B1 |
| APPLICATION NO. | : 10/110186 |
| DATED | : December 22, 2009 |
| INVENTOR(S) | : Hoshuyama et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this

Ninth Day of November, 2010

David J. Kappos
*Director of the United States Patent and Trademark Office*